US012680322B1

(12) United States Patent
Banks

(10) Patent No.: US 12,680,322 B1
(45) Date of Patent: Jul. 14, 2026

(54) MOBILE ABRASIVE SLURRY DELIVERY APPARATUS

(71) Applicant: Wesley Banks, Prior Lake, MN (US)

(72) Inventor: Wesley Banks, Prior Lake, MN (US)

( * ) Notice: Subject to any disclaimer, the term of this patent is extended or adjusted under 35 U.S.C. 154(b) by 0 days.

(21) Appl. No.: 19/243,148

(22) Filed: Jun. 19, 2025

(51) Int. Cl.
| | |
|---|---|
| *E04G 21/04* | (2006.01) |
| *B60P 3/22* | (2006.01) |
| *F04B 17/05* | (2006.01) |
| *F04B 17/06* | (2006.01) |
| *F04B 23/02* | (2006.01) |

(52) U.S. Cl.
CPC ........ *E04G 21/0436* (2013.01); *B60P 3/2245* (2013.01); *F04B 17/05* (2013.01); *F04B 17/06* (2013.01); *F04B 23/021* (2013.01); *Y10S 417/90* (2013.01)

(58) Field of Classification Search
CPC ......... B60P 3/224; B60P 3/2245; B60P 3/225; B60P 1/28; B60P 1/1283; C04B 2111/70; F04B 17/05; F04B 17/06; F04B 23/021; F04B 23/023; F04B 9/105; F04B 9/1053; F04B 9/1056; E04G 21/0436; Y10S 417/90; Y10T 417/90
USPC ....................................................... 417/900
See application file for complete search history.

(56) References Cited

U.S. PATENT DOCUMENTS

| | | | |
|---|---|---|---|
| 2,061,425 | A | 11/1936 | Karstens |
| 2,286,761 | A | 6/1942 | Poulter |

| | | | | | |
|---|---|---|---|---|---|
| 2,792,973 | A | * | 5/1957 | Price | ......................... B62B 1/26 |
| | | | | | 222/626 |
| 3,125,257 | A | * | 3/1964 | Vukich | ................. F04B 9/1056 |
| | | | | | 222/255 |
| RE26,820 | E | * | 3/1970 | Bennett | ................. F04B 9/1178 |
| | | | | | 417/317 |
| 3,981,635 | A | * | 9/1976 | Hedlund | ................. F04B 9/105 |
| | | | | | 91/422 |
| 4,029,442 | A | * | 6/1977 | Schlosser | ................. F04B 7/04 |
| | | | | | 417/489 |
| 5,141,363 | A | | 8/1992 | Stephens | |
| 5,336,052 | A | | 8/1994 | Zollner | |
| 5,690,478 | A | | 11/1997 | Zollner | |
| 5,839,883 | A | | 11/1998 | Schmidt et al. | |
| 6,598,683 | B1 | | 7/2003 | Ultimo et al. | |
| 6,733,247 | B2 | | 5/2004 | Dwyer et al. | |
| 6,779,983 | B1 | | 8/2004 | Olsen | |
| 6,976,804 | B1 | | 12/2005 | Asplin | |
| 7,226,274 | B1 | | 6/2007 | Asplin | |
| 7,311,865 | B2 | | 12/2007 | Williamson | |
| 8,186,907 | B1 | | 5/2012 | Asplin | |
| 9,725,917 | B2 | | 8/2017 | Huh | |
| 10,060,078 | B2 | | 8/2018 | Vargas et al. | |

(Continued)

FOREIGN PATENT DOCUMENTS

| | | | | | | |
|---|---|---|---|---|---|---|
| GB | | 2168759 | A | * | 6/1986 | ................ B60P 1/60 |
| WO | WO-2017011401 | A1 | * | 1/2017 | ............. F04B 53/22 |

*Primary Examiner* — Charles G Freay
*Assistant Examiner* — Joseph S. Herrmann
(74) *Attorney, Agent, or Firm* — Dietz Law Office LLC

(57) ABSTRACT

A gravity fed slurry delivery system capable of pumping high volumes of abrasive slurry at a worksite. A single operator mobile abrasive slurry delivery apparatus of the present invention may be used to pump an abrasive grout slurry at high volumes or pressure to lift concrete slabs, to fill voids under concrete slabs, to deliver abrasive grout for compaction grouting, or to deliver abrasive grout for construction joint stabilization.

20 Claims, 23 Drawing Sheets

(56)  References Cited

U.S. PATENT DOCUMENTS

| 11,149,725 | B2 | 10/2021 | Keijers et al. |
| 2006/0275139 | A1 | 12/2006 | Schwing et al. |
| 2010/0050567 | A1 | 3/2010 | Vandewinckel et al. |
| 2010/0110726 | A1 | 5/2010 | Kuo |
| 2011/0114411 | A1* | 5/2011 | Merth ..................... F04B 17/05 |
| | | | 417/372 |
| 2016/0333898 | A1 | 11/2016 | Wechsel et al. |
| 2019/0212119 | A1 | 7/2019 | Eftestol et al. |
| 2019/0308342 | A1 | 10/2019 | Butler |
| 2023/0151624 | A1 | 5/2023 | Troyer |
| 2024/0060251 | A1 | 2/2024 | Asplin |

* cited by examiner

MOBILE ABRASIVE SLURRY DELIVERY APPARATUS

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a gravity fed slurry delivery system and more particularly, this invention relates to a mobile, gravity fed, delivery system capable of pumping high volumes of abrasive slurry at a worksite. The mobile abrasive slurry delivery apparatus of the present invention is particularly well suited for use by a single user. The delivery apparatus of the present invention is capable of pumping abrasive, extreme viscosity, grout at high volumes or pressure to lift concrete slabs, to fill voids under concrete slabs, to deliver abrasive grout for compaction grouting, or to deliver abrasive grout for construction joint stabilization.

BACKGROUND

In the past, flowable materials such as mud, sand, and liquid foam have been pumped under concrete slabs to fill voids and to apply pressure under the concrete slab. Pressure under the concrete slab may tend to lift or force the slab upwards to a desired grade. However, over time, these "lifting" materials tend to settle and the concrete slab once again settles below a desired grade. Although materials with higher viscosities would reduce the amount of potential settling of the material, the higher viscosity materials are highly abrasive or corrosive to the delivery equipment. Many past delivery systems include an auger that feeds the material towards a pump, however, these augers tend to jam when rotating through higher viscosity materials. Also, the high viscosity materials simply do not flow through the pumps or hoses of many past delivery systems, making it difficult or impossible to deliver high volumes of the abrasive materials without equipment malfunctions and break-down.

It is desirable to deliver high viscosity abrasive materials through a pump and hose without equipment malfunctions. The present invention provides a durable, gravity fed apparatus and method for delivering high viscosity, abrasive materials, such as an abrasive slurry of grout mixed with granite shards.

SUMMARY

Embodiments according to aspects of the invention include an apparatus and method for delivering a high volume of abrasive slurry from a mobile hopper. An embodiment of the mobile abrasive slurry delivery apparatus includes a base frame, a hopper frame, a hopper, a slurry outlet, an abrasive slurry pump, and hydraulic lift cylinders. The hopper frame is rotationally coupled to the base frame. The hopper has a bottom section, sidewalls, a front end wall and a rear end wall. The sidewalls, front end wall and rear end wall extend upward from the bottom section and the bottom section includes a main segment and a secondary segment. The secondary segment extends upward at an angle less than ninety degrees from a plane of the main segment. Also, the secondary segment has a slurry outlet opening formed in the secondary segment. A slurry tube is coupled to the hopper in a sealing alignment with the slurry outlet opening of the secondary segment which together form the slurry outlet. The abrasive slurry pump is mounted to the hopper and aligned with the slurry outlet opening of the secondary segment such that a free end of the abrasive slurry pump extends into the slurry tube. Further, each of the hydraulic lift cylinders has a first end coupled to the base frame and a second end coupled to the hopper frame.

Embodiments in accordance with these aspects of the invention may further provide the abrasive slurry pump including a hydraulic cylinder, a pump piston, and a plunger. Further, the plunger of the abrasive slurry pump is slidingly engaged to a pump piston rod of the pump piston. Also, the plunger of the abrasive slurry pump includes a base and pump piston rod guides. The pump piston rod guides of the plunger slidingly engage with the pump piston rod of the pump piston. Further, the base of the plunger is cylindrical and the base includes a bore extending through the base along a longitudinal axis of the base. An edge of an end of the bore of the base is aligned towards the pump piston rod and the edge is chamfered. Also, the pump piston includes a rod coupling, a pump piston rod, and a lower piston. The lower piston is positioned at a free end of the pump piston and the lower piston includes a chamfer on an outer end of the lower piston. Additionally, the mobile abrasive slurry delivery apparatus includes a hydraulic reservoir and hydraulic pump fluidly coupled to the hydraulic lift cylinders and the abrasive slurry pump. Also, the mobile abrasive slurry delivery apparatus includes hydraulic directional controls that are fluidly coupled between the hydraulic pump and the hydraulic lift cylinders and the abrasive slurry pump. The hydraulic directional controls control a flow of a hydraulic fluid between the hydraulic lift cylinders and the abrasive slurry pump.

In accordance with aspects of the invention, an alternative embodiment of the present invention includes a base frame, a hopper frame, a slurry tube or outlet, an abrasive slurry pump, hydraulic lift cylinders, a hydraulic fluid reservoir and a hydraulic fluid pump. The hopper frame is rotationally coupled to the base frame. The hopper has a bottom section, sidewalls, a front end wall and a rear end wall. The sidewalls, front end wall and rear end wall extend upward from the bottom section. The bottom section includes a main segment and a secondary segment such that the secondary segment extends upward at an angle less than ninety degrees from a planar surface of the main segment. Also, the secondary segment has a slurry outlet opening formed in the secondary segment. The slurry tube couples to the hopper in a sealing alignment with the slurry outlet opening of the secondary segment. The abrasive slurry pump is mounted to the hopper and is aligned with the slurry outlet opening of the secondary segment, such that a free end of the abrasive slurry pump extends into the slurry tube. The abrasive slurry pump includes a hydraulic cylinder, a pump piston, and a plunger, wherein the plunger of the abrasive slurry pump includes a base and pump piston rod guides. Further, each hydraulic lift cylinder has a first end coupled to the base frame and a second end coupled to the hopper frame. Additionally, the hydraulic pump is fluidly coupled between the hydraulic fluid reservoir and the hydraulic lift cylinders and the abrasive slurry pump.

Embodiments according to these aspects of the invention may further include a plunger of the abrasive slurry pump that is slidingly engaged to the pump piston rod of the pump piston. Also, the piston rod guides of the plunger slidingly engage with the pump piston rod of the pump piston. The base of the plunger is cylindrical and the base includes a bore extending through the base along a longitudinal axis of the base. An edge of an end of the bore is aligned towards the pump piston rod and the edge of the bore opening is chamfered. Further, the pump piston includes a rod coupling, a pump piston rod, and a lower piston. The lower piston is positioned at a free end of the pump piston and the lower piston includes a chamfer on an outer end of the lower piston. The mobile abrasive slurry delivery apparatus further includes hydraulic directional controls or controller fluidly coupled between the hydraulic pump and the hydraulic lift cylinders and the abrasive slurry pump. The hydraulic controller controls flow of a hydraulic fluid between the hydraulic lift cylinders and the abrasive slurry pump.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

Figure 13:
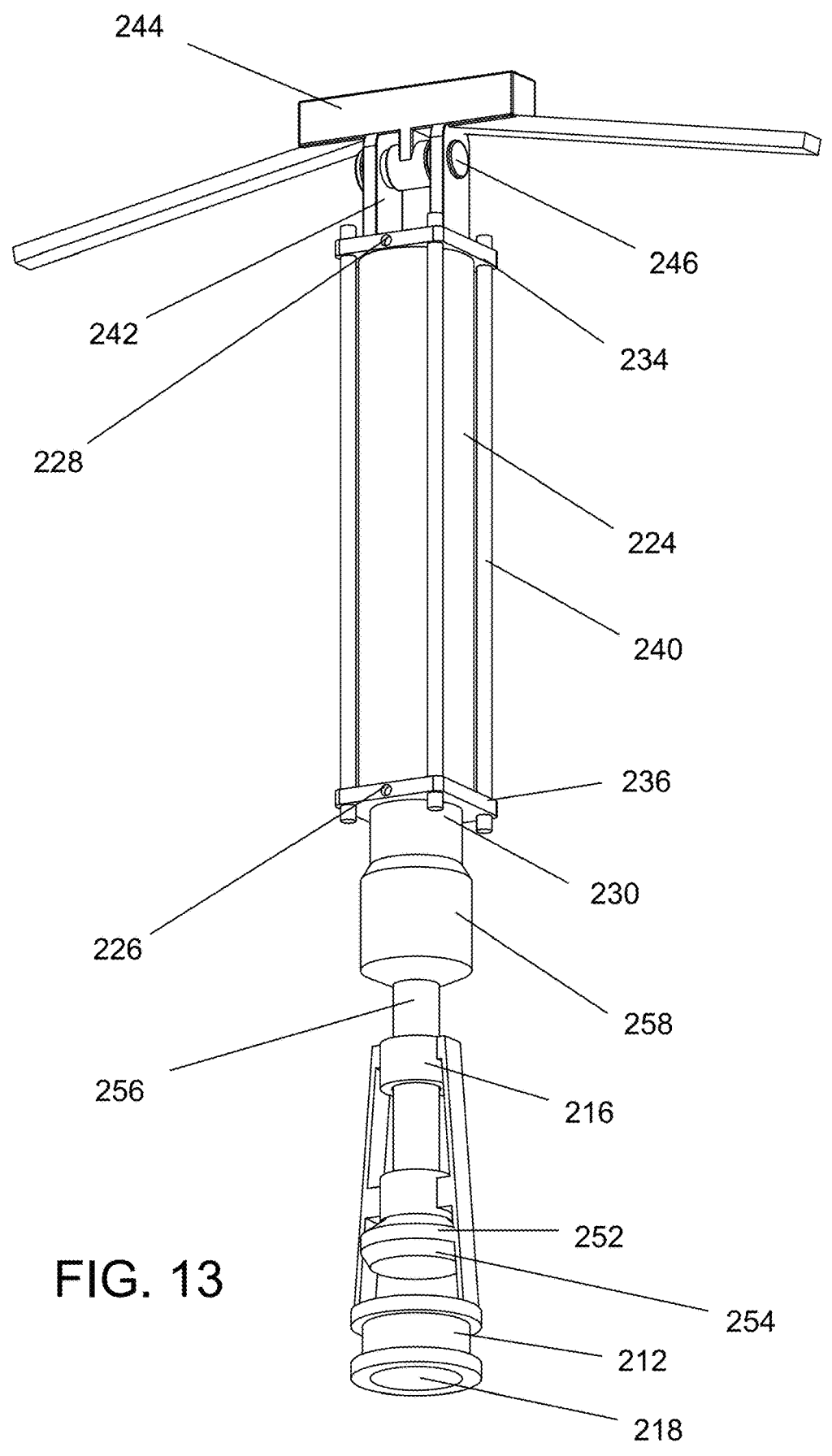

FIG. 13 is a front bottom perspective view of an abrasive slurry pump of the mobile abrasive slurry delivery apparatus in accordance with aspects of the present invention;

DETAILED DESCRIPTION

Figure 1:
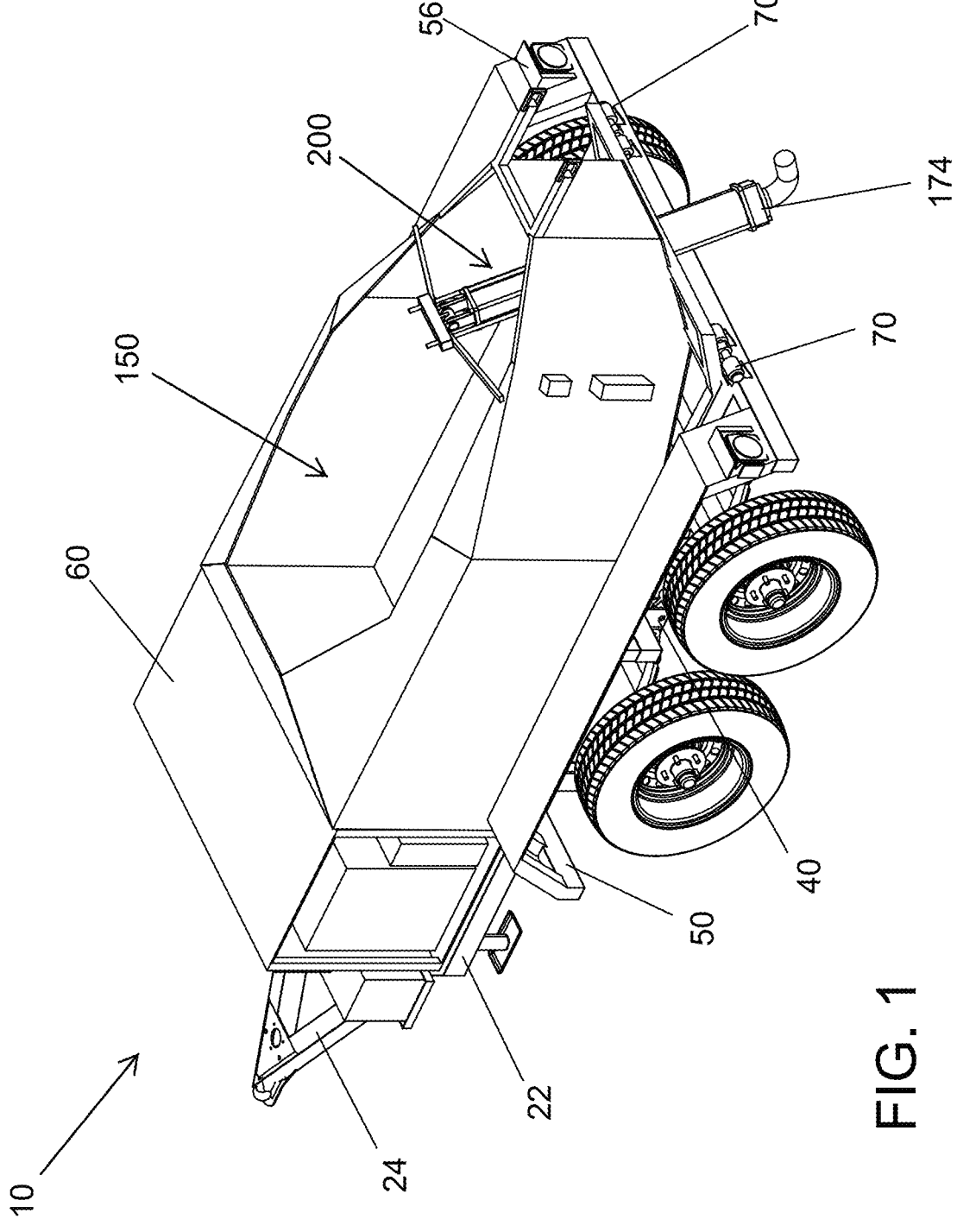
FIG. 1 is a back side perspective view of a mobile abrasive slurry delivery apparatus in accordance with aspects of the present invention shown with the hopper in the down position.
Figure 2:
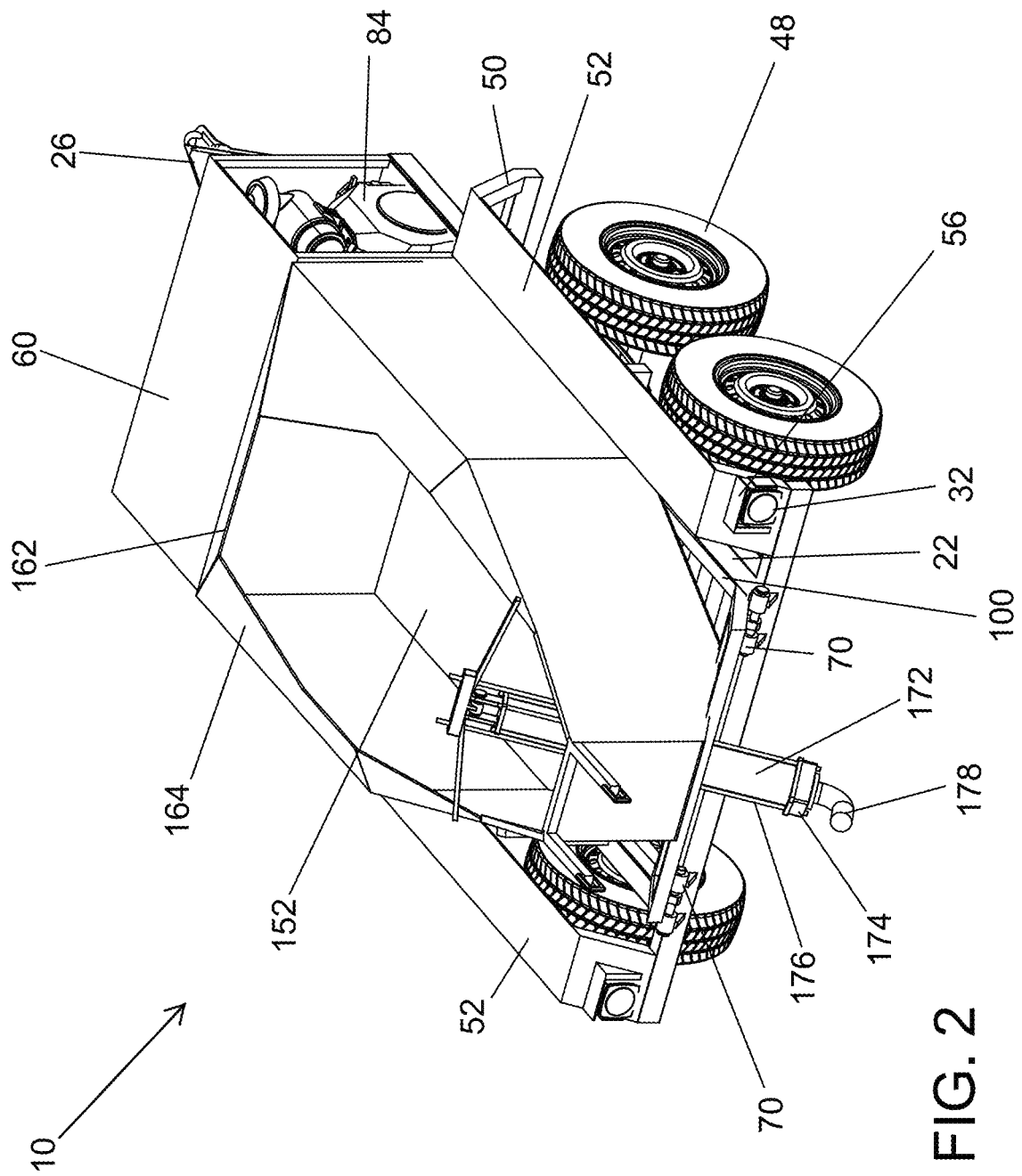
FIG. 2 is a back end perspective view of a mobile abrasive slurry delivery apparatus in accordance with aspects of the present invention shown with the hopper in the down position.
Figure 3:
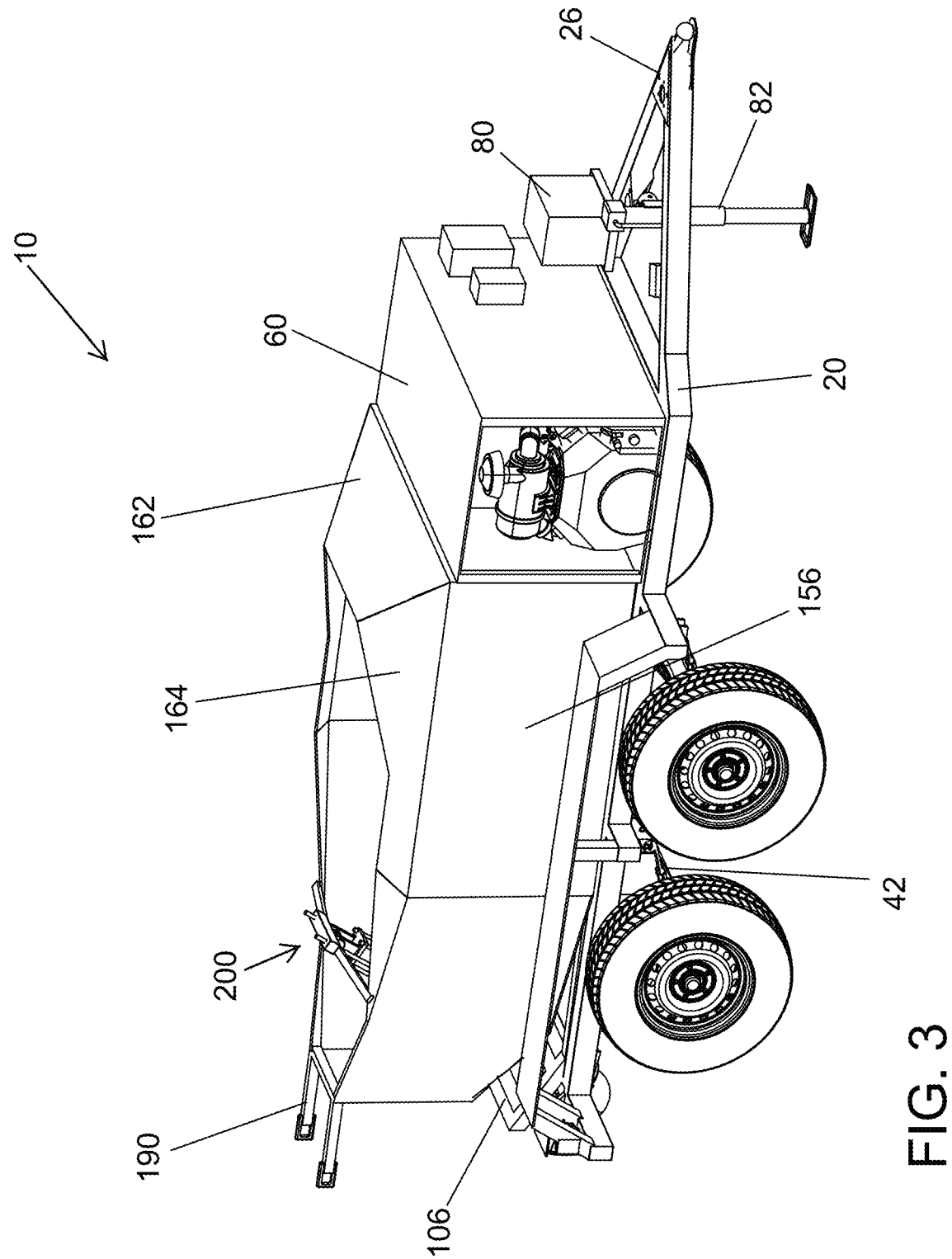
FIG. 3 is a left side perspective view of a mobile abrasive slurry delivery apparatus in accordance with aspects of the present invention shown with the hopper in the down position.
Figure 4:
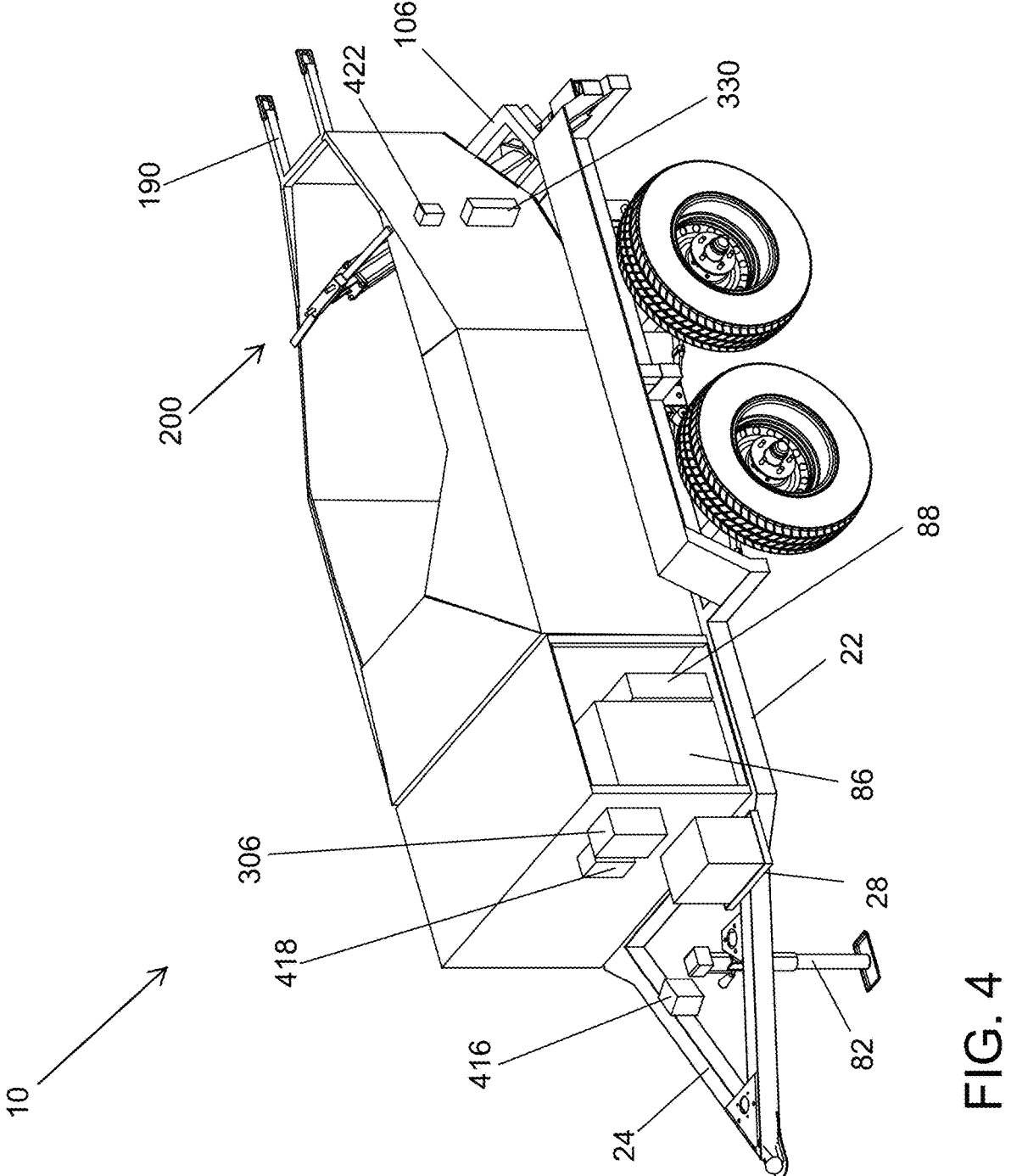
FIG. 4 is a right side perspective view of an overcoat bucket support in accordance with aspects of the present invention shown supporting a bucket.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The mobile abrasive slurry delivery apparatus and system 10 of the present invention is well suited to deliver highly abrasive materials, including a slurry of grout and granite shards, without pump blockage or other equipment malfunction. The delivery apparatus of the present invention eliminates the need for a material feeding auger an provides a robust pump that pulverizes material that would otherwise block the flow of materials through the pump. With reference to FIGS. 1-4, the mobile abrasive slurry delivery apparatus and system 10 generally includes a trailer 20, a front divided box 60, hopper frame 100, hopper body 150, abrasive slurry outlet 170, and pump 200. Trailer 20 generally includes a frame 22, tongue 24, tow coupling 26, fender supports 50, fenders 52, jack mount 30 and battery mount 28. A battery 80 is mounted to the battery mount and a jack 82 is fixed to the jack mount 30. Although the jack 82 is shown as a manual type that is used to raise and lower the tongue 24, those skilled in the art will appreciate that an electrical jack of known suitable construction may be fixed to the jack mount and electrically coupled to the battery 80. Brake lights 32 are mounted to a rear end portion of the fenders 52 and brake light guards are fixed to the fenders 52 above the brake lights 32 to reduce potential damage to the brake lights 32. Hydraulic fluid pump 88 and hydraulic fluid reservoir 86 are mounted within a compartment of the front divided box 60. Further, a gas powered engine 84 is mounted within the box 60 and the engine output shaft is coupled to the hydraulic fluid pump 88 in a known suitable manner to thereby provide power to the hydraulic fluid pump 88. Without limitation, a 27 horse power 2-cycle or 4-cycle engine 84 has been found to provide sufficient power to operate the hydraulic fluid pump 88. Those skilled in the art will appreciate that the trailer 20 may take the form of a bed or frame of a motor vehicle onto which the hopper frame 100 is rotationally mounted.

Hopper frame 100 includes a primary 104 and a secondary angled support frame 106. The secondary frame 106 angles upward from a plane or planar surface of the main or primary frame 104. The hopper frame 100 supports the hopper body 150 fixed to the frame 100. The hopper body 150 includes a main floor segment 152 and an angled floor segment 154. The angled floor segment 154 angles upward from a plane or planar surface of the main or primary floor segment 152. The amount the angled floor segment angles upward from the main floor matches the angle between the secondary frame 106 and primary frame 104. Although the angle is preferably about 30 degrees, the angle should be less than 90 degrees. Hopper sides 156, a hopper front end 158 and a hopper rear end extend perpendicularly upward from the hopper floor. A front angled top splash guard 162 extends inward from an upper edge of the hopper front end 158 and side angled top splash guards extend inward from an upper edge of the sidewalls 156. Hose mount arms 190 extend out the back end of the hopper 150 and are suitable for hanging a grout delivery hose (not shown) during transportation. A grout outlet 170 is formed in the angled floor segment 154. A grout pump tube 172 extends outwardly and downward from the angled floor segment 154. The grout pump tube 172 aligns with the grout outlet 170 and seals to the floor segment 154. A pump mount base 174 is coupled to a free end of the grout pump tube 172 and a grout outlet elbow 178 couples to the pump mount base 174 and grout pump tube 172. Hopper hinge mounts 130 are fixed to a rear outer end or edge of the secondary hopper frame 106 and hopper lift cylinder mounts 140 are fixed to a mid-section of the hopper primary frame 104. Without limitation intended, the hopper body 150 may be constructed from a sheet metal having thickness ranging from 0.125 to 0.250 inches.

Figure 5:
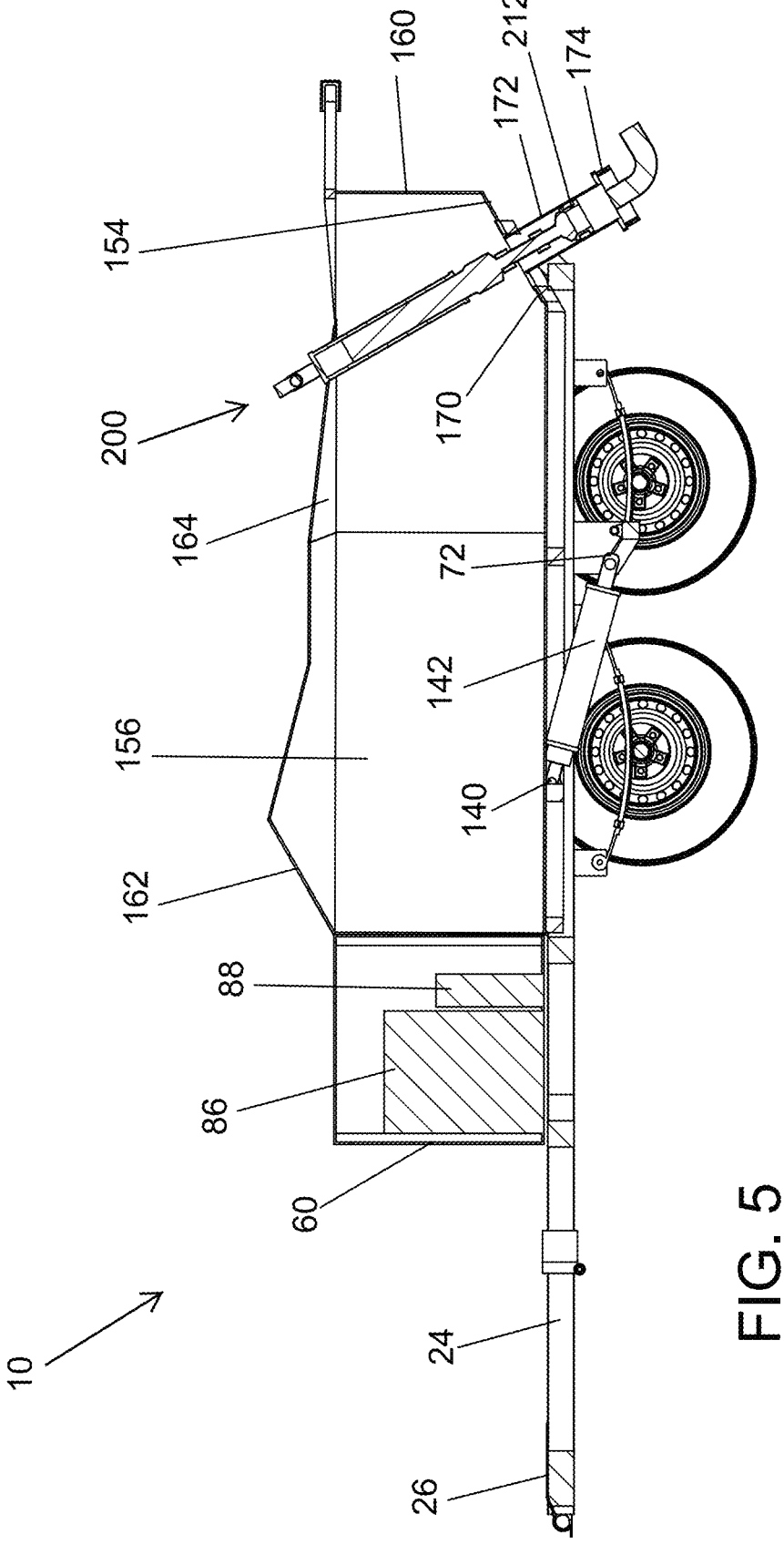
FIG. 5 is a partial sectional side elevational view of a mobile abrasive slurry delivery apparatus in accordance with aspects of the present invention shown with the hopper in the down position.
Figure 6:
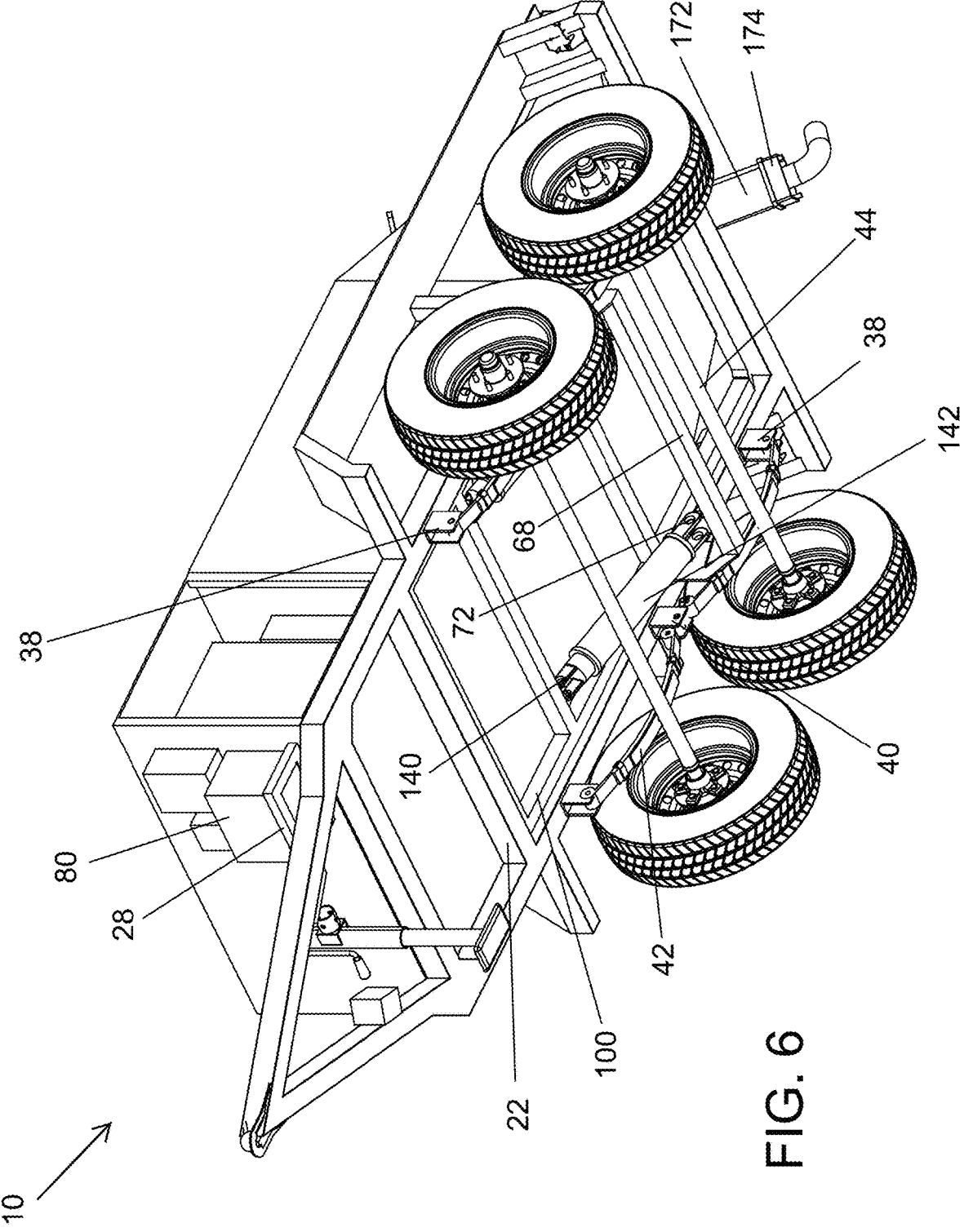
FIG. 6 is a right front bottom perspective view of a mobile abrasive slurry delivery apparatus in accordance with aspects of the present invention shown with the hopper in the down position.
Figure 7:
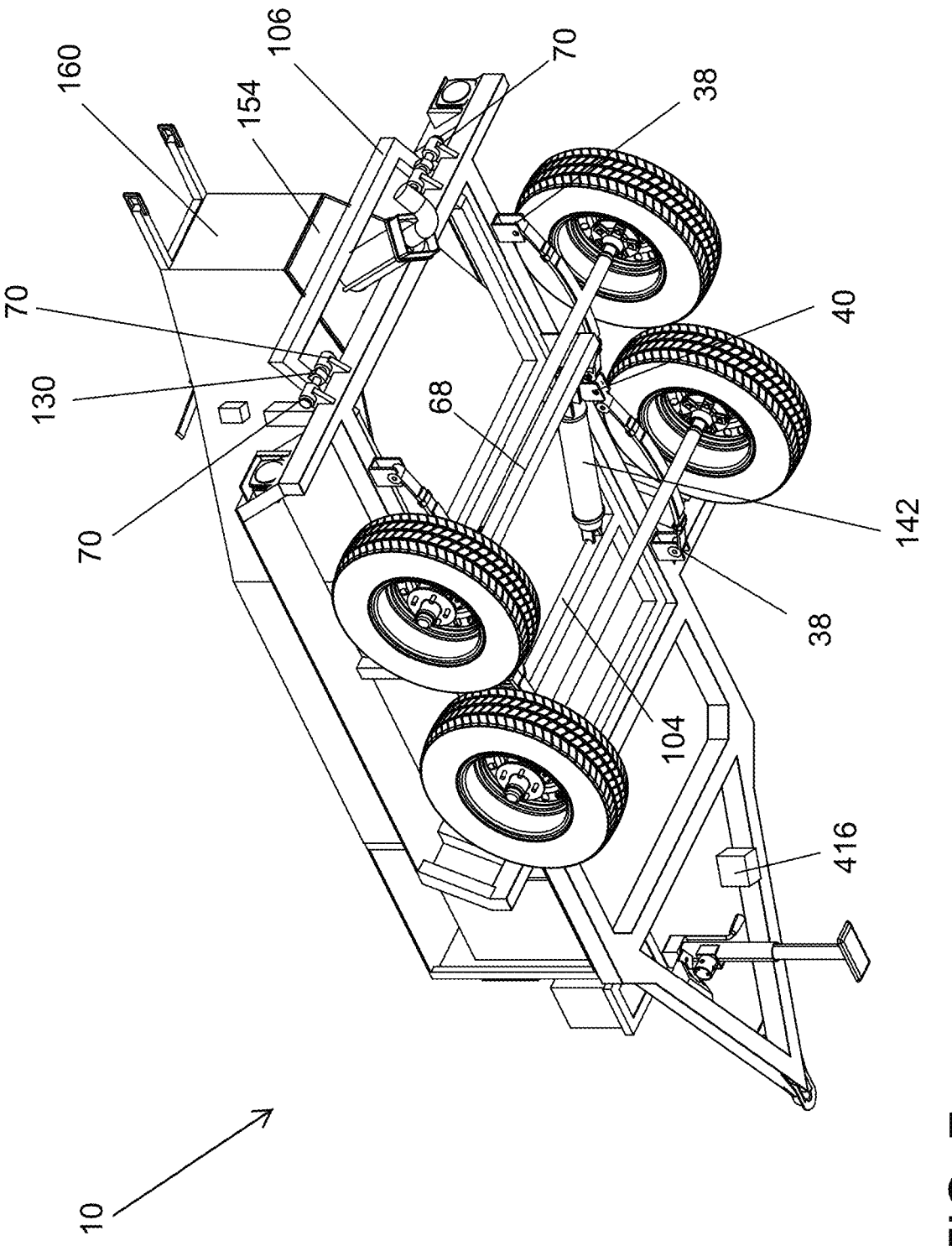
FIG. 7 is a right back bottom perspective view of a mobile abrasive slurry delivery apparatus in accordance with aspects of the present invention shown with the hopper in the down position.
Figure 8:
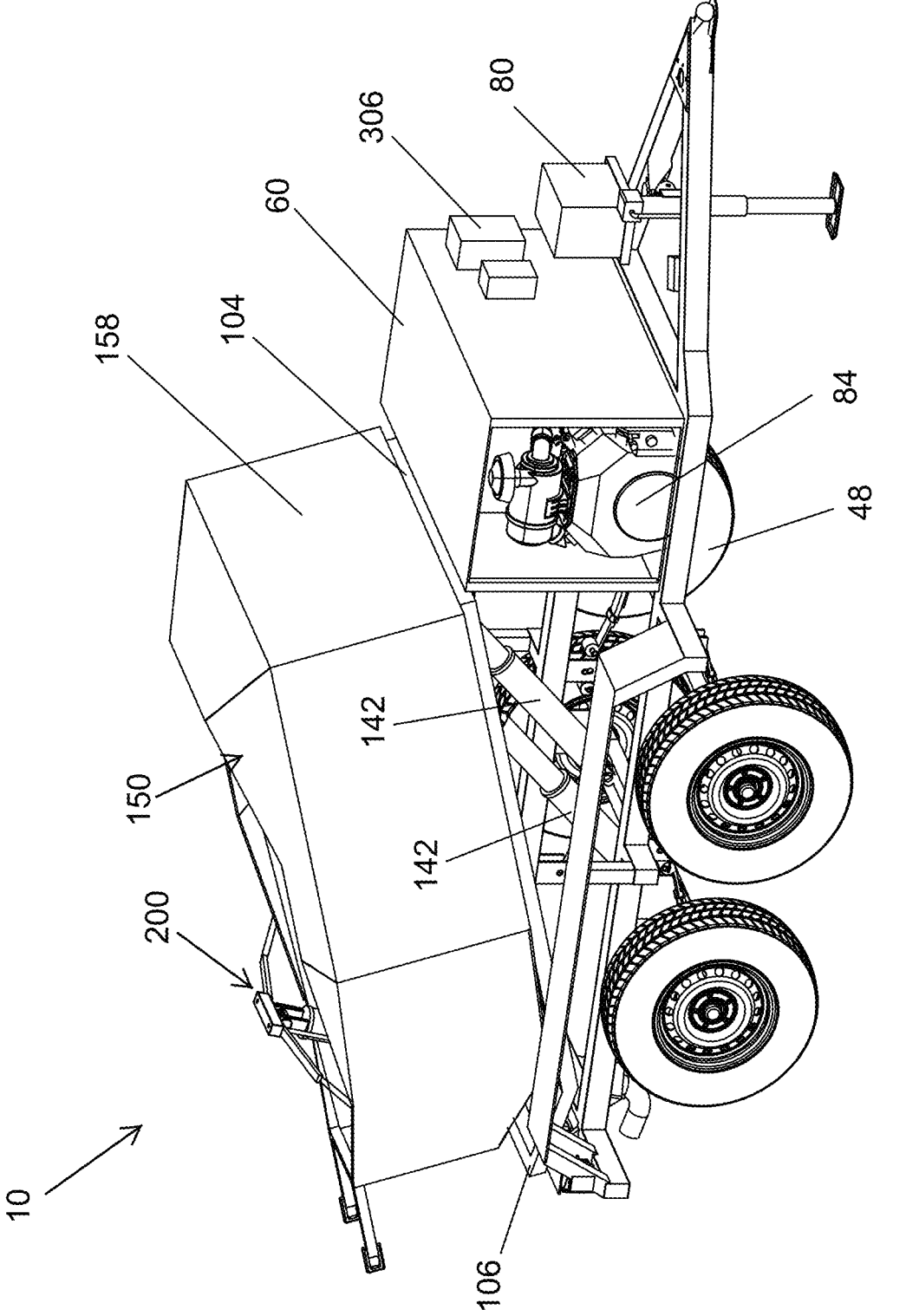
FIG. 8 is a front left side top perspective view of a mobile abrasive slurry delivery apparatus in accordance with aspects of the present invention shown with the hopper in the lift position.
Figure 9:
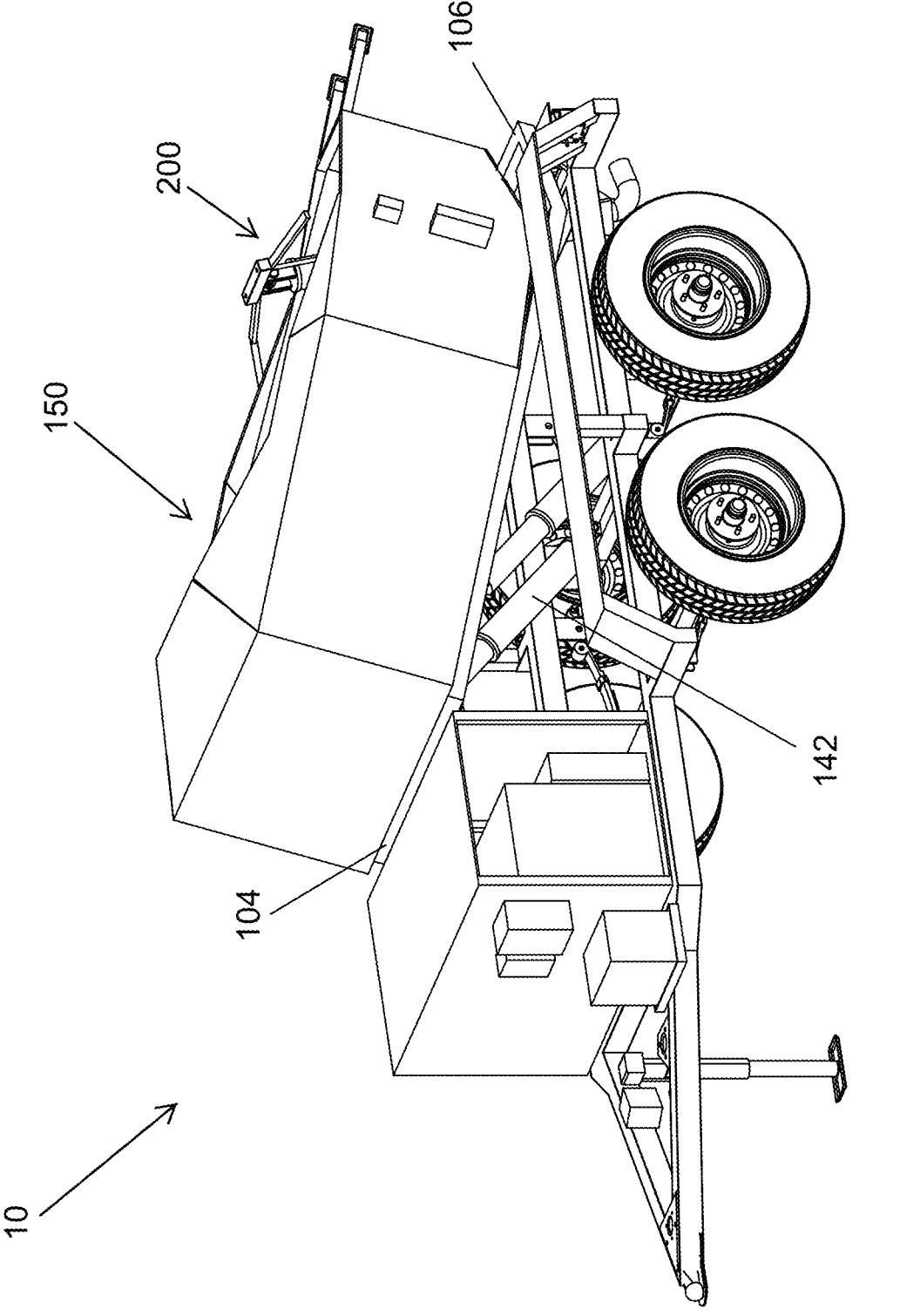
FIG. 9 is a front right side top perspective view of a mobile abrasive slurry delivery apparatus in accordance with aspects of the present invention shown with the hopper in the lift position.
Figure 10:
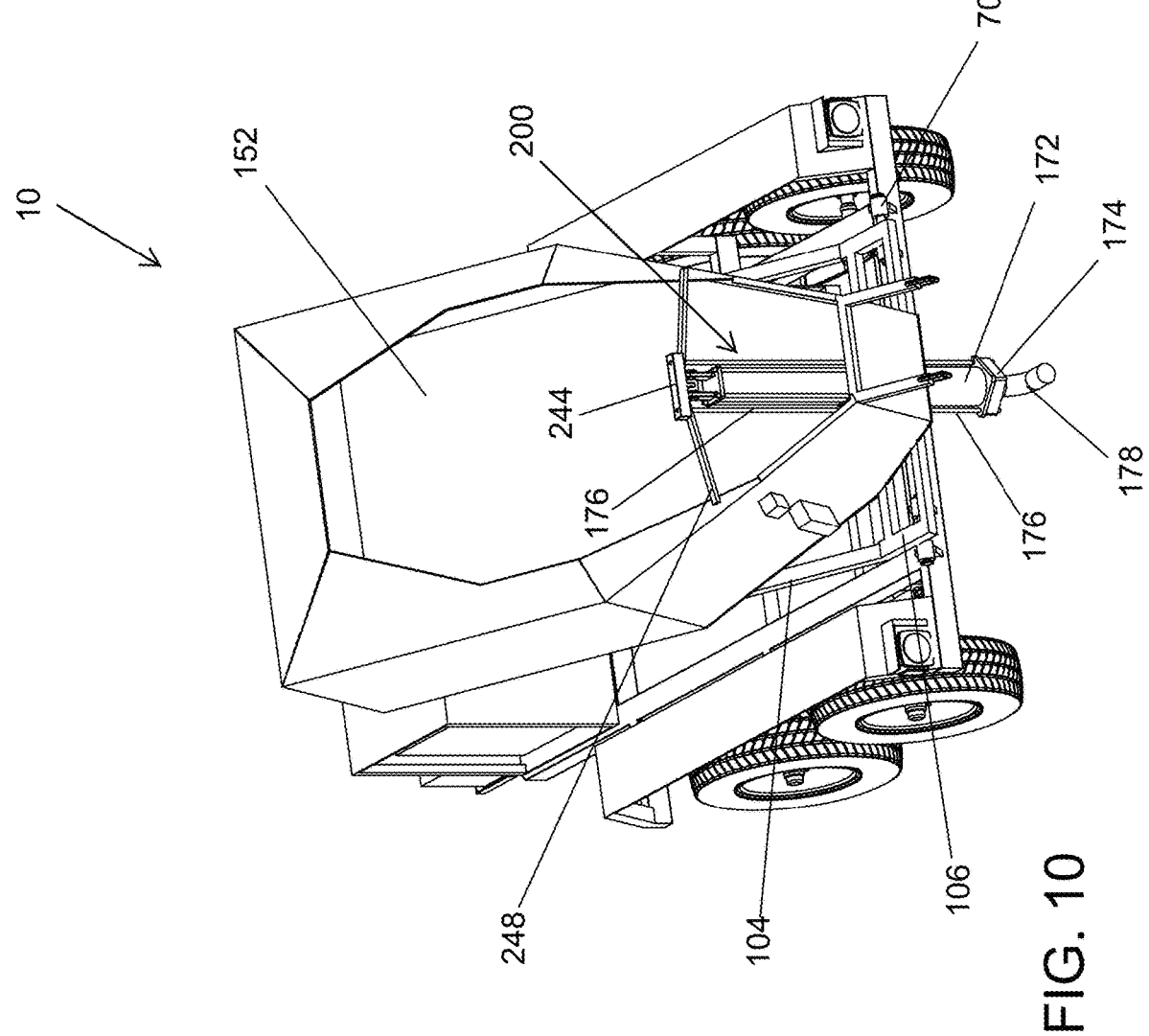
FIG. 10 is a top back end perspective view of a mobile abrasive slurry delivery apparatus in accordance with aspects of the present invention shown with the hopper in the lift position.
Figure 11:
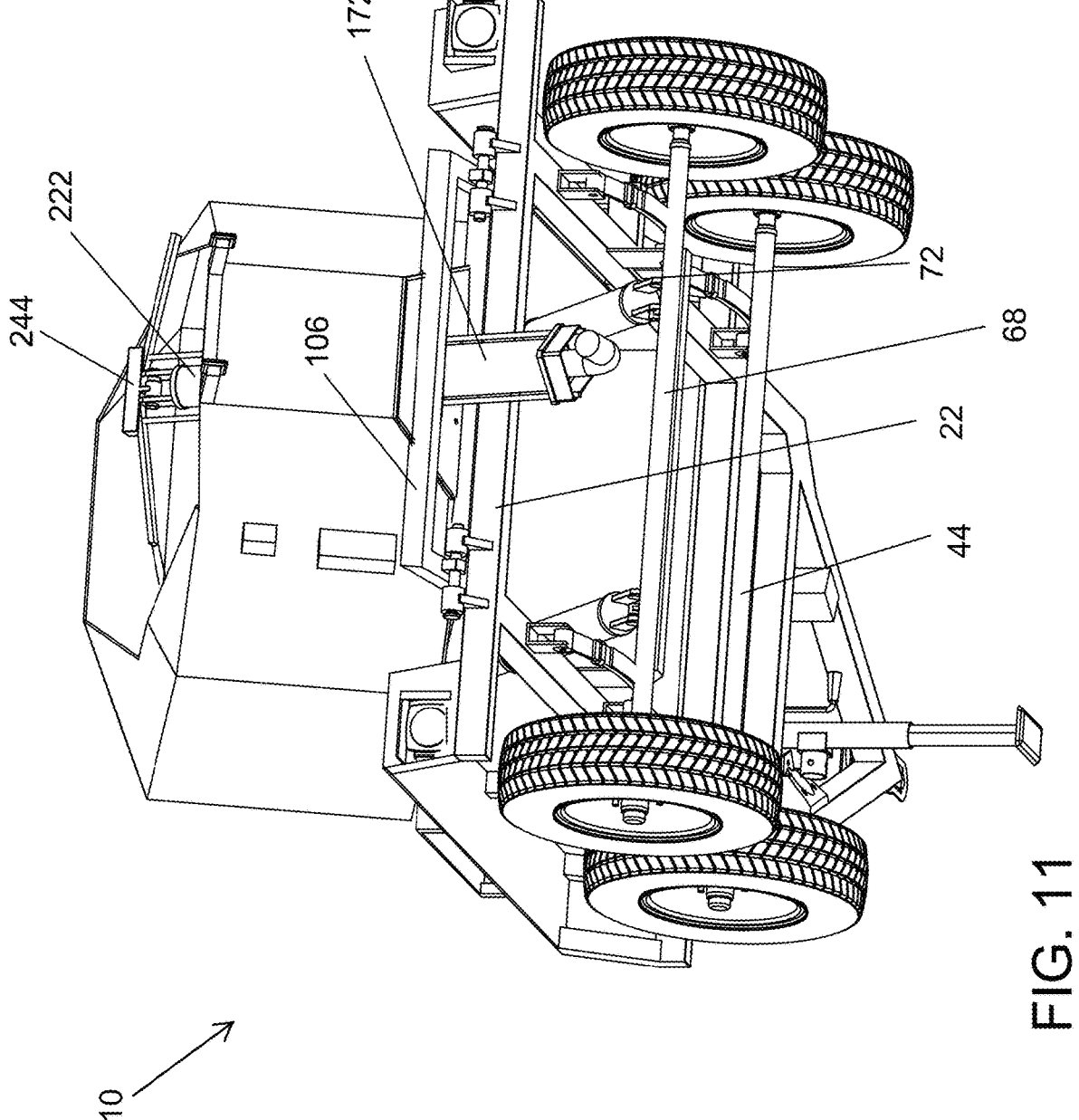
FIG. 11 is a bottom back perspective view of a mobile abrasive slurry delivery apparatus in accordance with aspects of the present invention shown with the hopper in the lift position.
Figure 12:
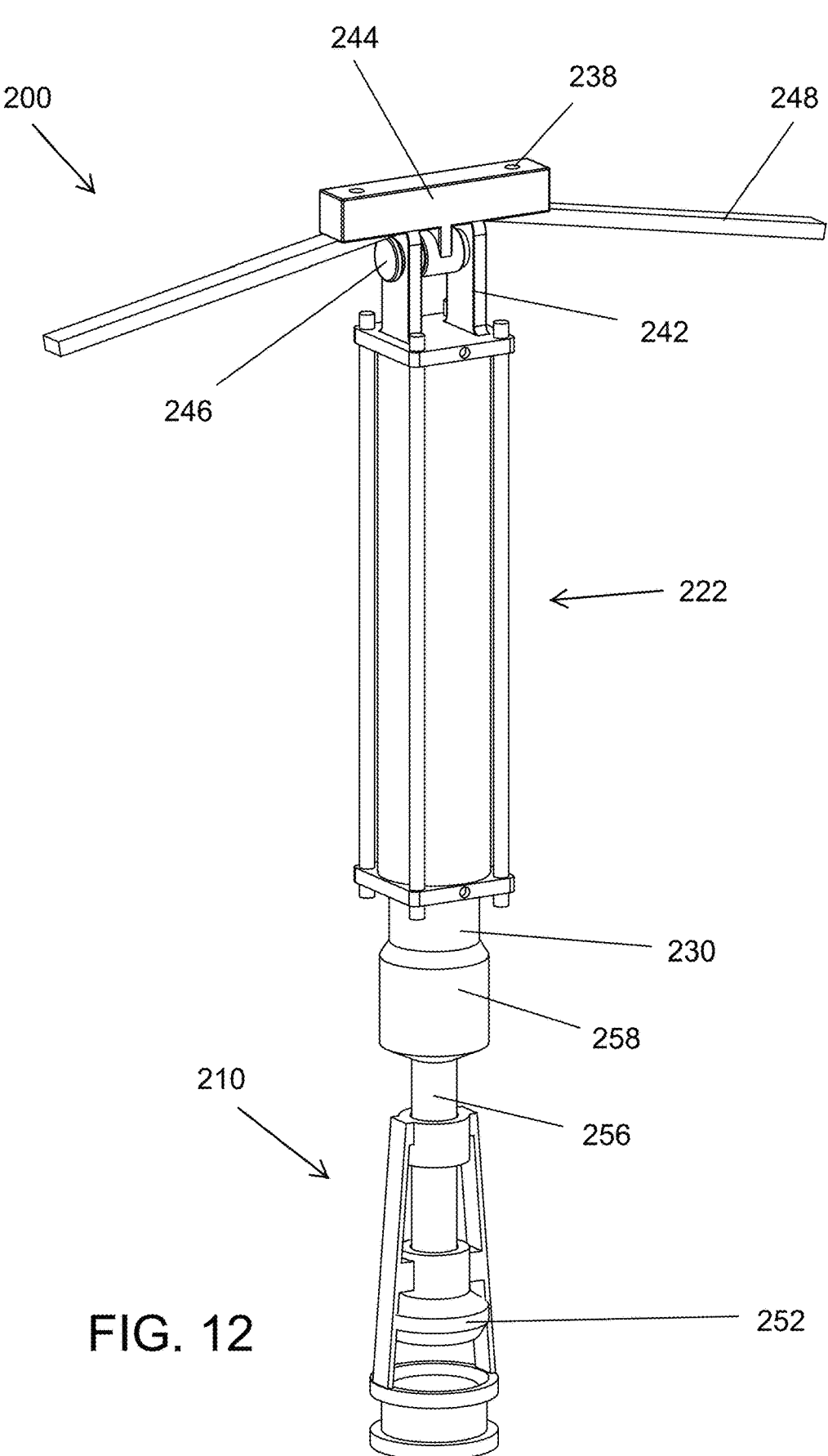
FIG. 12 is a front top perspective view of an abrasive slurry pump of the mobile abrasive slurry delivery apparatus in accordance with aspects of the present invention.
Figure 14:
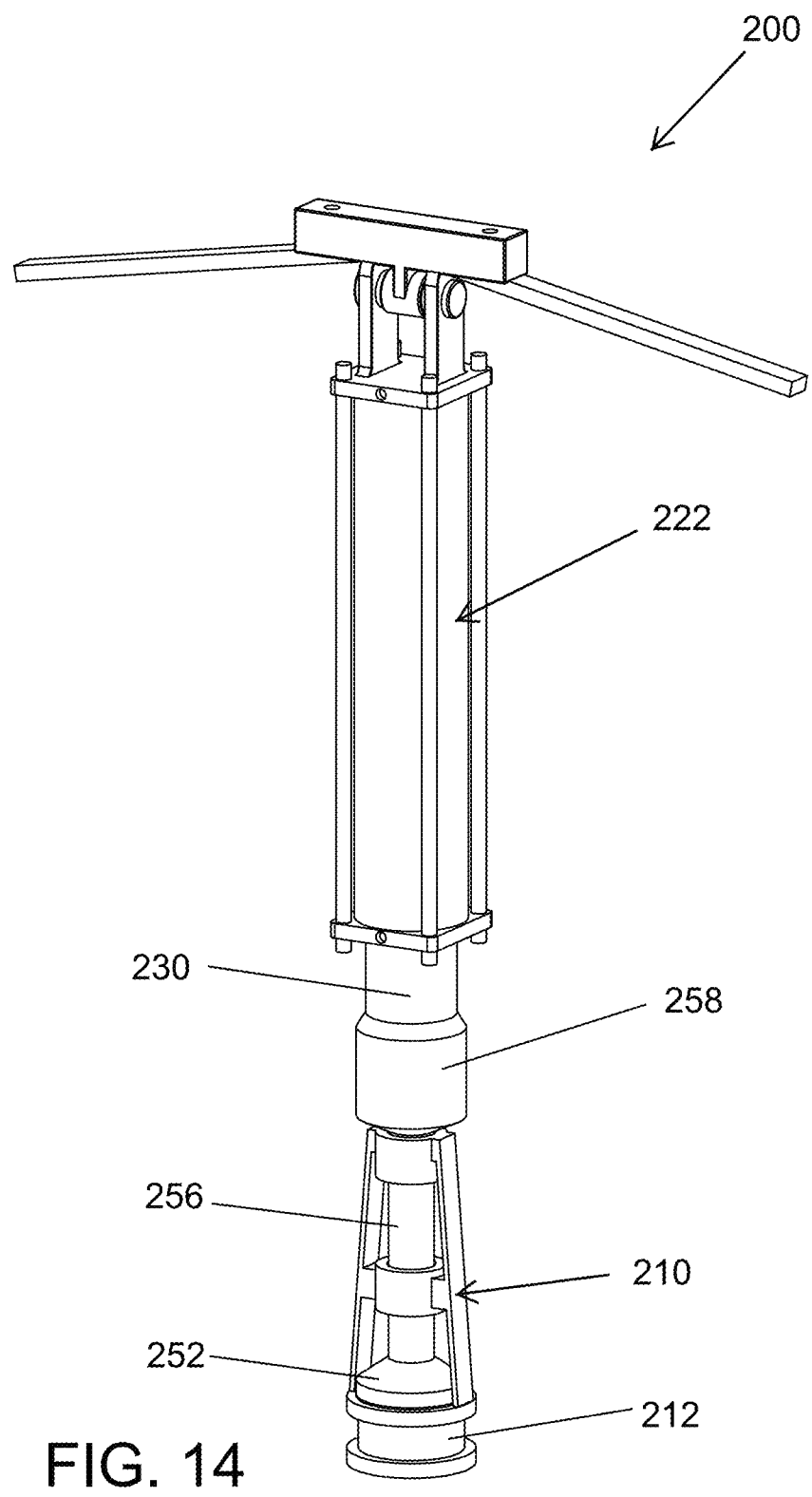
FIG. 14 is a front perspective view of an abrasive slurry pump of the mobile abrasive slurry delivery apparatus in accordance with aspects of the present invention shown in the initial pumping position.
Figure 15:
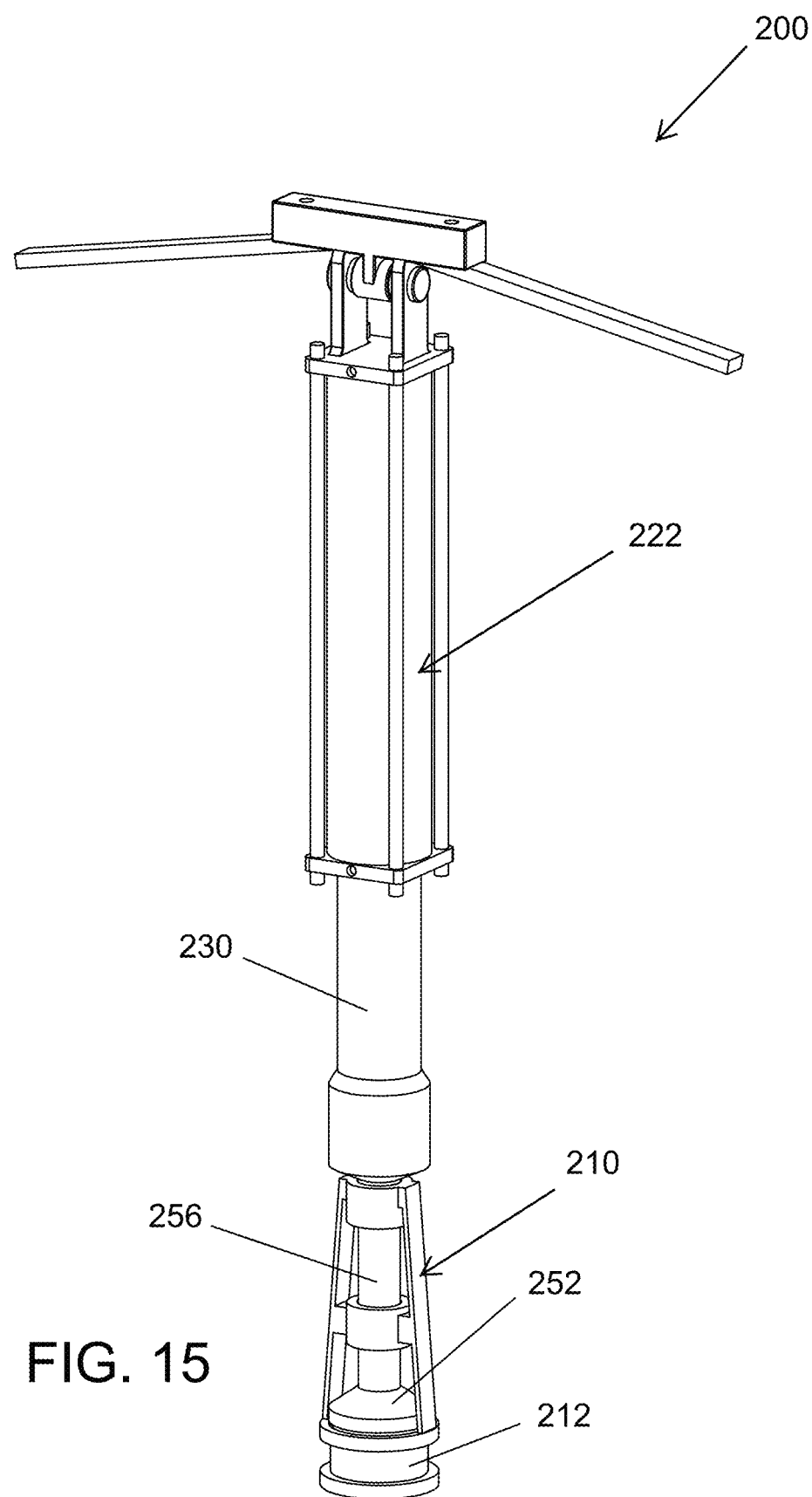
FIG. 15 is a front perspective view of an abrasive slurry pump of the mobile abrasive slurry delivery apparatus in accordance with aspects of the present invention shown in the mid pumping position.
Figure 16:
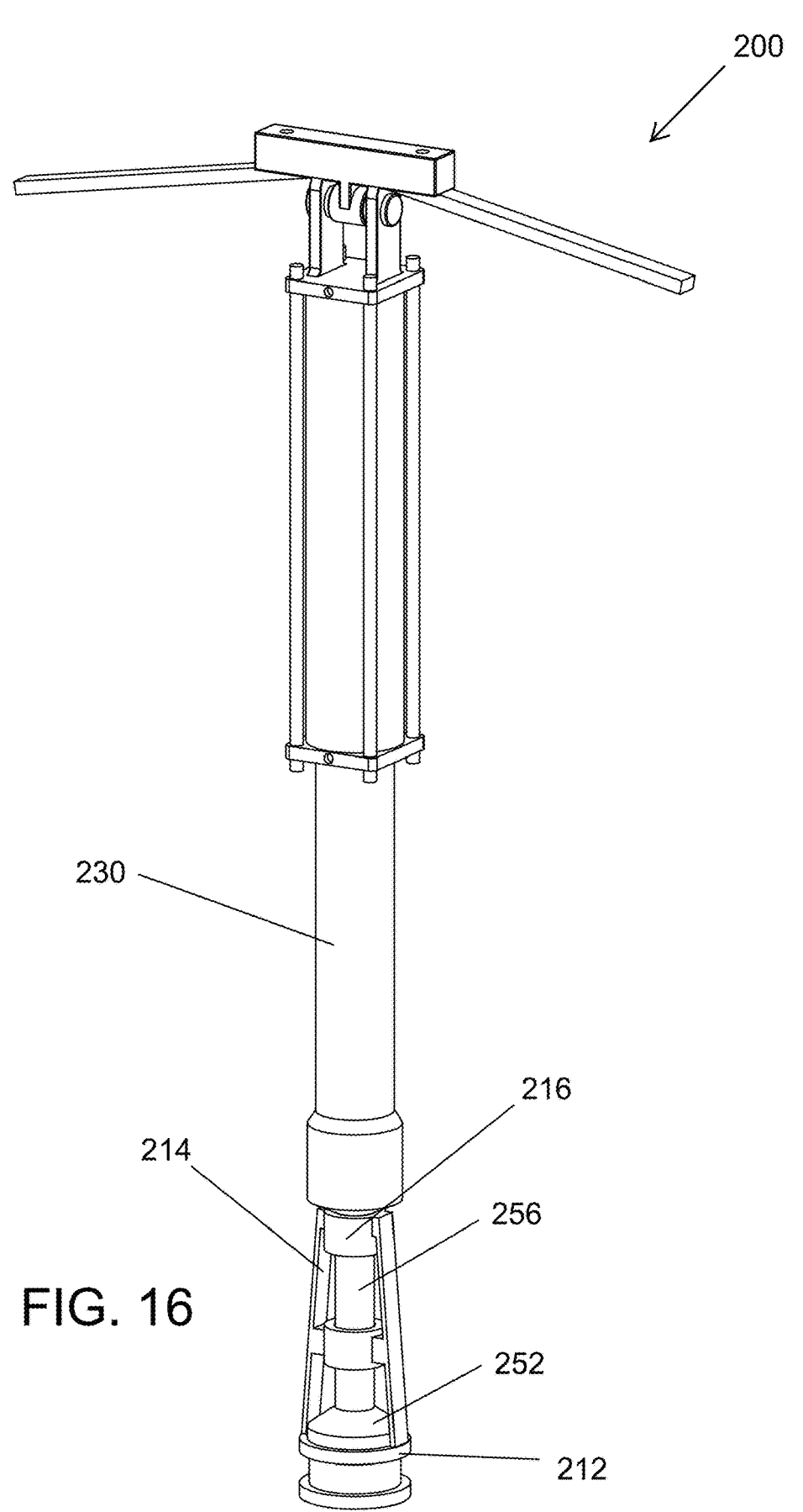
FIG. 16 is a front perspective view of an abrasive slurry pump of the mobile abrasive slurry delivery apparatus in accordance with aspects of the present invention shown in the fully extension pumping position.
Figure 17:
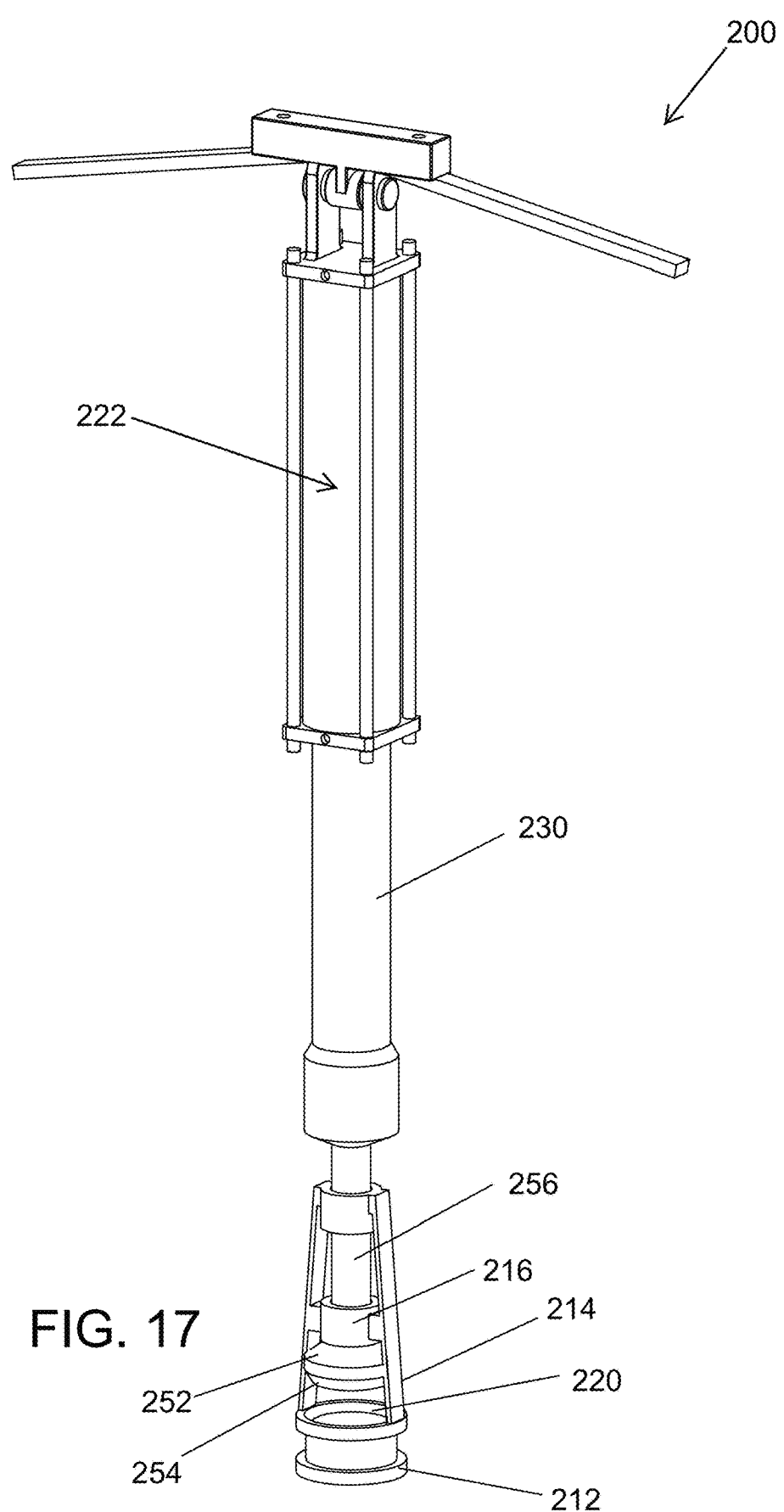
FIG. 17 is a front perspective view of an abrasive slurry pump of the mobile abrasive slurry delivery apparatus in accordance with aspects of the present invention shown in the initial retract position.
Figure 18:
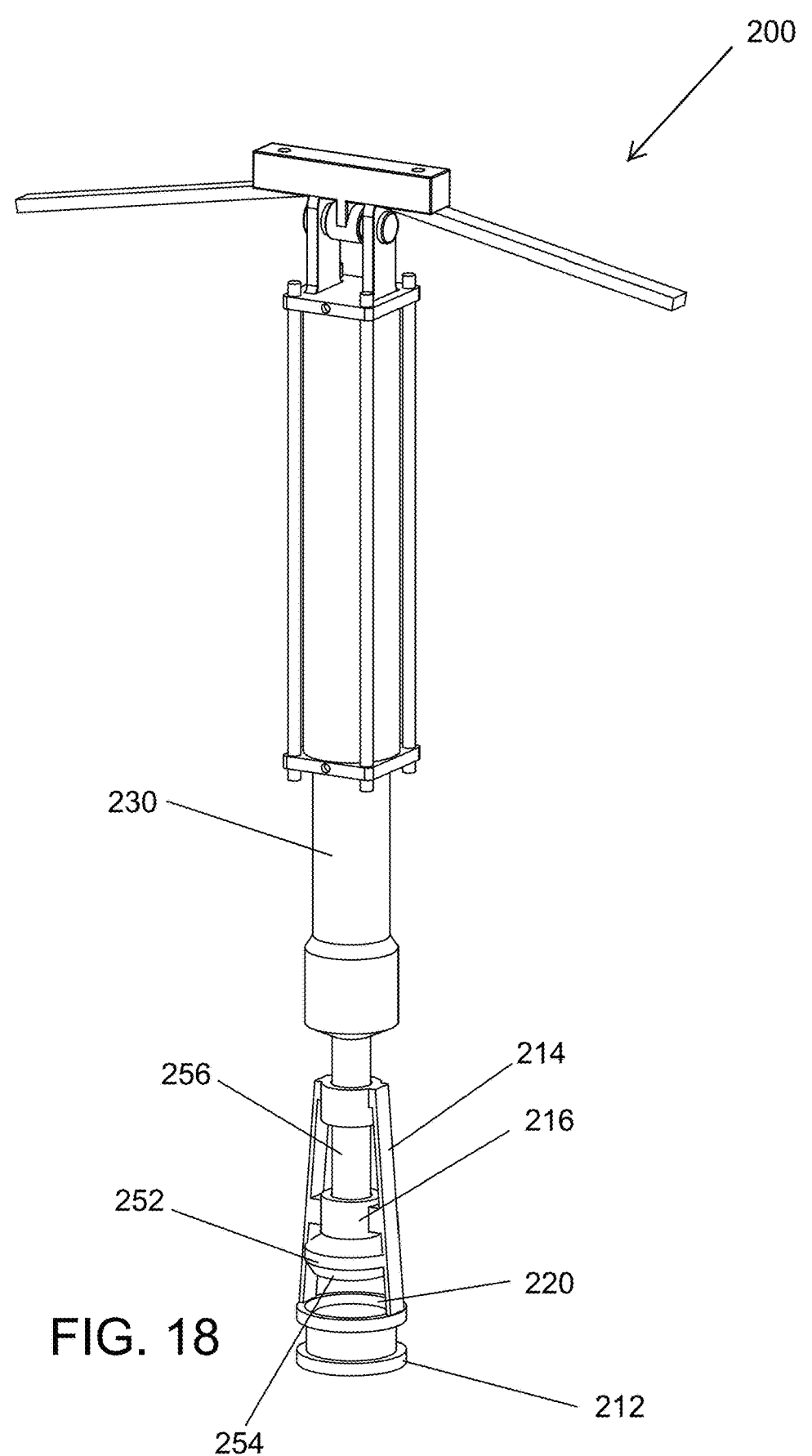
FIG. 18 is a front perspective view of an abrasive slurry pump of the mobile abrasive slurry delivery apparatus in accordance with aspects of the present invention shown in the mid retract position.
Figure 19:
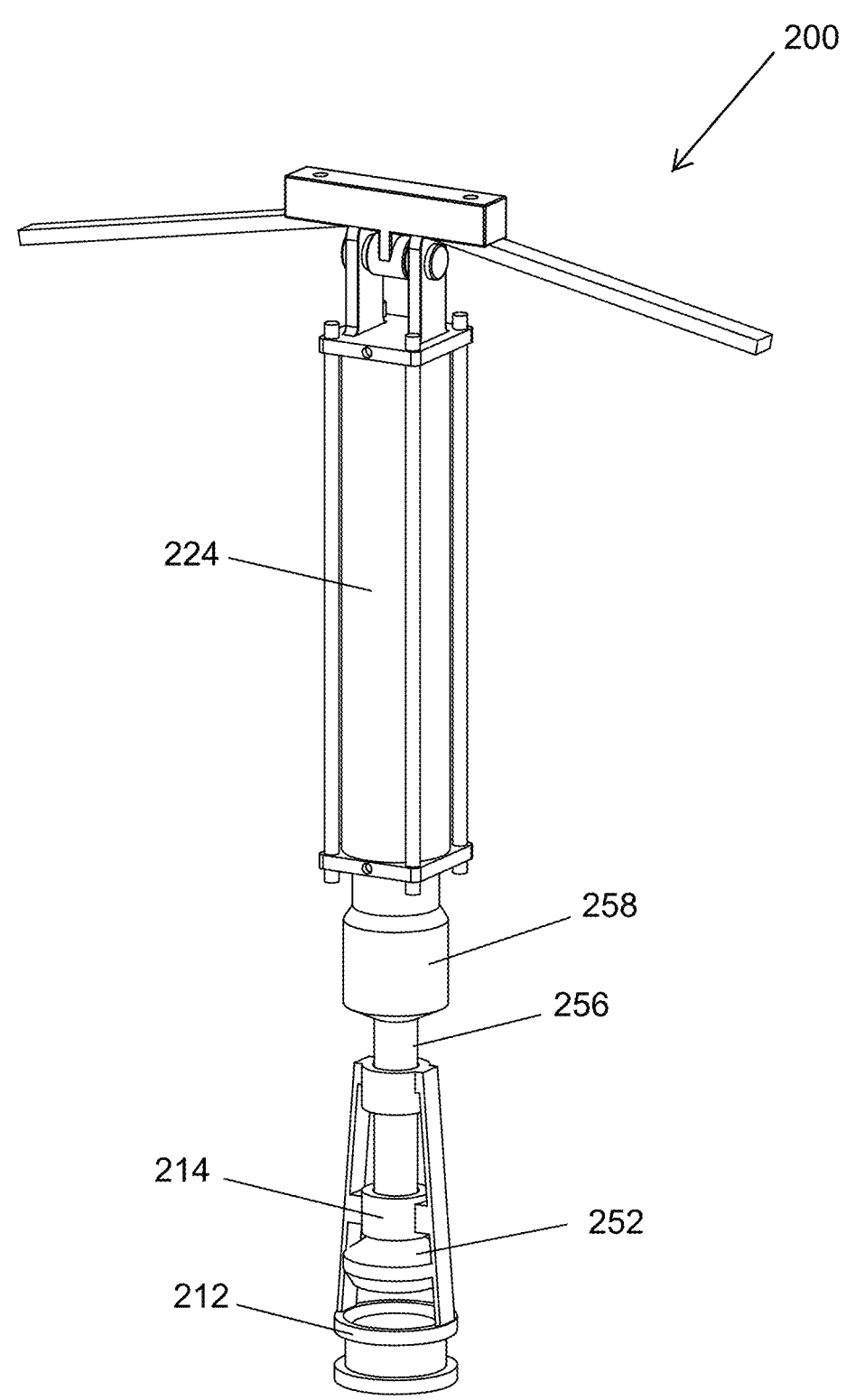
FIG. 19 is a front perspective view of an abrasive slurry pump of the mobile abrasive slurry delivery apparatus in accordance with aspects of the present invention shown in the complete retract position.
Figure 20:
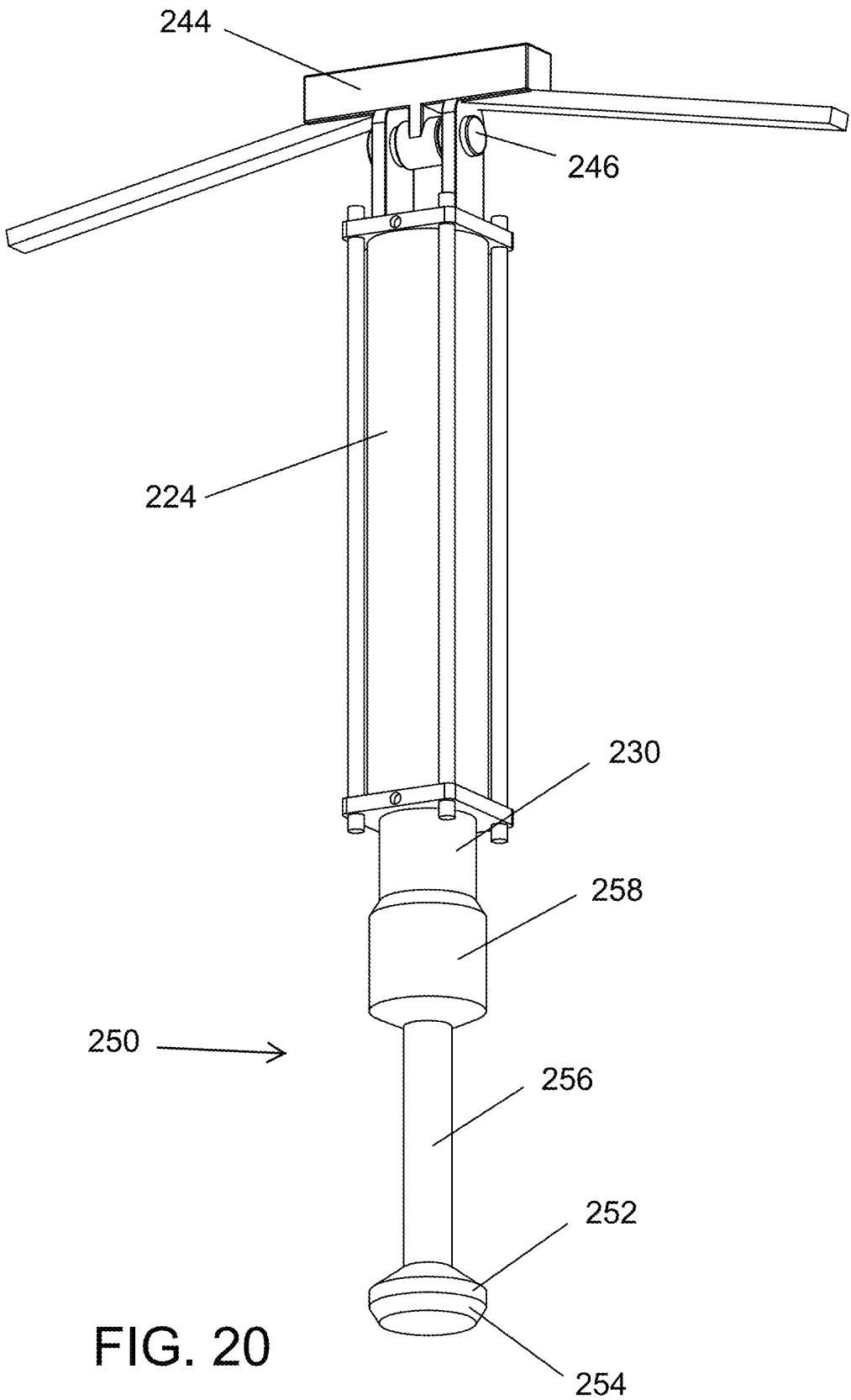
FIG. 20 is a front perspective view of an abrasive slurry pump of the mobile abrasive slurry delivery apparatus in accordance with aspects of the present invention shown with the plunger removed to further illustrate in the pump piston.
Figure 21:
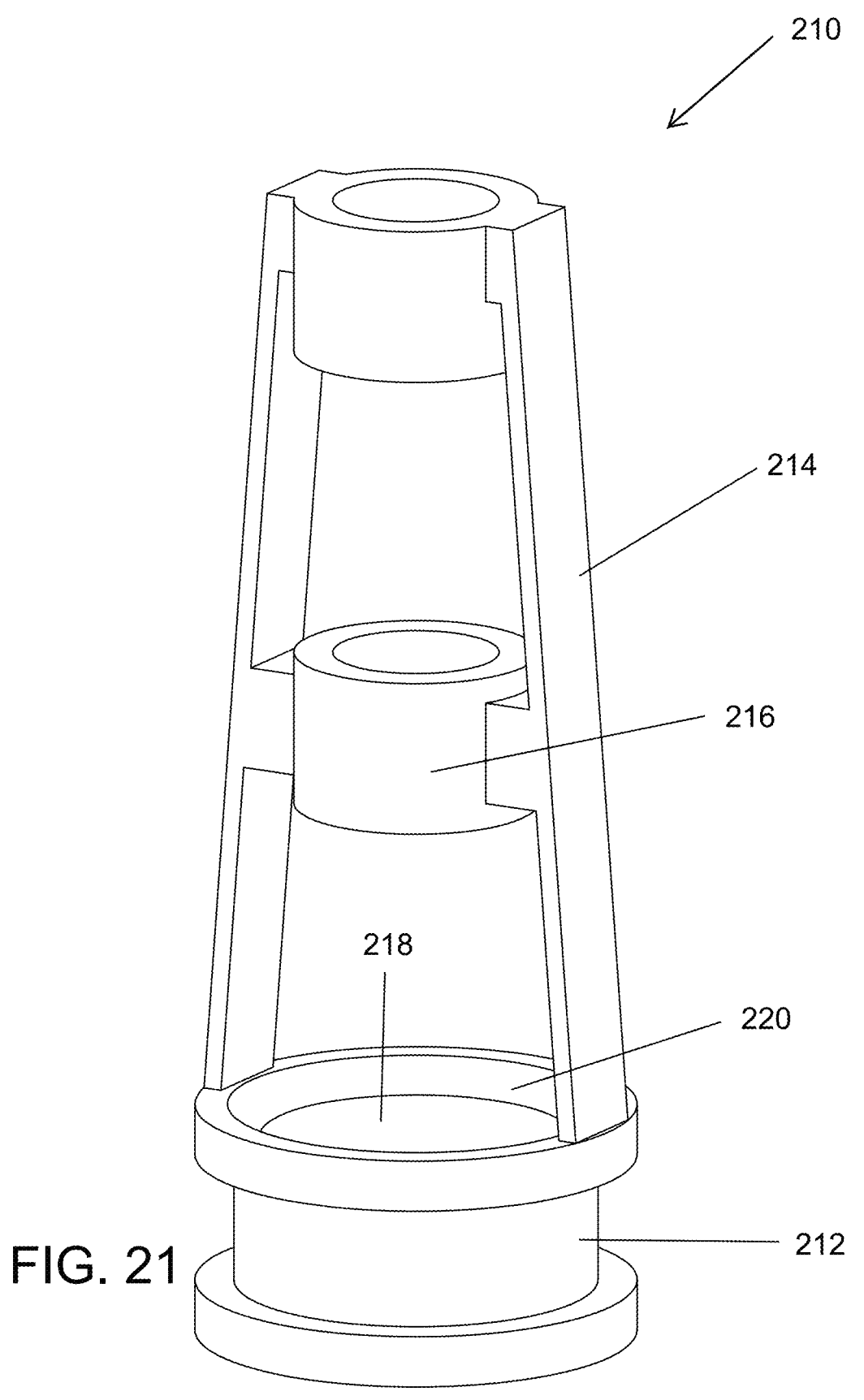
FIG. 21 is a front perspective view of the pump plunger of the mobile abrasive slurry delivery apparatus in accordance with aspects of the present invention shown.

With reference to FIGS. 5-7 the suspension of the trailer 20 is shown having dual axle assemblies 44 to which tires 48 are mounted. Each axle assembly 44 is of a known suitable construction having a maximum rating of 6,000 lbs. Each axle assembly is mounted to a leaf spring 42. One end of each leaf spring 42 is rotationally coupled to a leaf spring single hanger or mount 38 fixed to the trailer frame 22 and the other end of each leaf spring 42 is rotationally coupled to a leaf spring dual hanger or mount 40. A frame crossbar 68 extends below the main frame 22 of the trailer 20. The trailer frame 22, fender supports 50, crossbar 68, and hopper frame 100 may be constructed from a square or rectangular tubular galvanized steel or aluminum material or other suitable material of known suitable construction. Hopper hinge clevis mounts 70 are fixed to a rear cross member of the frame 22. Likewise, hopper lift cylinder mounts 72 are fixed to the frame crossbar 68. Hydraulic lift cylinders 142 are rotationally mounted with clevis pins, one end to the hopper lift cylinder mounts 140 and the other end to the trailer 22 hopper lift cylinder mounts 72. Further, pins rotationally join hopper hinge mounts 130 of the hopper frame 100 with the hopper hinge clevis mounts 70 of the frame 22 of trailer 20.

Referring next to FIGS. 8-11, the hopper 150 is shown in the pumping or emptying position. Hydraulic pump 88 delivers hydraulic fluid to the hydraulic lift cylinders 142 to actuate a rod of the lift cylinders outward. As the rods extend outward, the hopper frame 100 and hopper 150 rotate about the hopper hinge mounts 130 and trailer hinge mounts 70. As the hopper 150 is elevated at an angle, grout within the hopper flows toward the angled floor segment 152. Without limitation intended, the sides and floor of the hopper are sized such that the capacity of the hopper is approximately 2.2 cubic yards of a granite grout slurry mix without overfilling. The pump 200 pumps the grout out the pump outlet 170 and grout pump tube 172. As the grout slurry empties out of the hopper, the front end of the hopper may be further elevated so that the pump remains submerged in the grout slurry until the grout slurry completely empties from the hopper. In this manner, the need for a material feed auger is eliminated.

Referring to FIGS. 12-13, and 20-21, the components of the pump 200 are further illustrated. Pump 200 includes a plunger 210, hydraulic cylinder 222, and pump piston 250. The hydraulic cylinder 222 has a cylinder body 224, cylinder rod 230, top mount plate 234 and bottom mount plate 236. Cylinder mount rods 240 extend between the top plate 234 and bottom plate 236 to couple and engage the plates to the cylinder body 224. Hydraulic fluid ports 226 and 228 are formed in the top plate 234 and bottom plate 236 and extend into the hydraulic cylinder body 224 for delivery of fluid within the hydraulic body. As fluid is delivered into port 228 the cylinder rod 230 extends out the cylinder body and as fluid is delivered into port 226 the rod 230 retracts into the cylinder body 224.

Pump piston 250 has a cylinder rod coupling 258 that couples a pump piston rod 256 to the cylinder rod 230. A lower piston 252 is formed or fixed to the free end of pump piston rod 256. A bottom edge of the lower piston is chamfered 254 (see FIG. 20). Plunger 210 has a base 212 and spaced apart pump piston rod guides 216 elevated above the base 212 by support arms 214. The pump piston rod guides 216 are slidingly coupled to the pump piston rod 256 between the lower piston 252 and the rod coupling 258. The cylindrical base 212 includes a bore 218 that extends through the base concentric with the cylindrical longitudinal axis of the cylindrical base 212. An open-end edge of the bore of the base 212 that is aligned to face towards the lower piston 252 is chamfered 220. The chamfer 220 of the base 212 is sized to receive the chamfer 254 of the lower piston 252 in sealing relation.

Pump 200 further has a hanging mount 244, mount pin 246, and hanging extension arms 248. The hanging mount 244 couples to clevis mount 242 on top plate 234 of the hydraulic cylinder 222. The extension arms are fixed to the hanging mount 244 and free ends of the extension arms are coupled or fixed to a top portion of the hopper sidewalls. Apertures 238 extend through the hanging mount 244 and are adapted for receiving pump mount rods 176. The pump mount rods extend through the angled floor segment 154 and one end of each rod 176 is fixed to the pump mount base 174 and the other end of the rod is fixed to the hanging mount 244. In this manner, the pump 222 is suspended from the hopper 150 such that the plunger and pump piston are positioned within the grout pump tube 172 (See FIG. 5).

FIGS. 14-19 illustrates the sequence of actuating the plunger 210 between a pumping and retracting or reloading position. As the cylinder rod 230 extends out of the cylinder body 224 the chamfer 254 of the lower piston 252 engages with the chamfer 220 of the base 212 (see FIGS. 14-16). As the cylinder rod 230 is retracted back into the cylinder body 224, the rod slides through the guides 216 until a top portion of the lower piston 252 engages a pump piston rod guide 216 (see FIGS. 17-19). When the pump 200 is positioned in the hopper 150 and the pump 200 is submerged in a grout slurry, extending the pump cylinder rod 230 seals the lower piston 252 to the base 212 and pushes grout out of the hopper through the grout pump tube 172. As the cylinder rod 230 retracts the grout slurry flows past the lower piston 252 into the bore 218 of the base 212. Reciprocating the cylinder rod 230 quickly between the pumping and reloading positions causes the grout slurry to forcefully pump through the grout pump tube 172 and out the grout outlet 178. At least the lower piston 252 of the pump piston 250 and the base 212 of the plunger 210 are made of carbon steel. At times large chunks of granite shard may flow through the plunger 210 and lodge against the chamfer 229 of the base. As the carbon steel lower piston 252 is actuated towards the base 212, the granite shard is crushed and forced through the bore of the base rather than bending the components of the plunger and pump piston.

Figure 22:
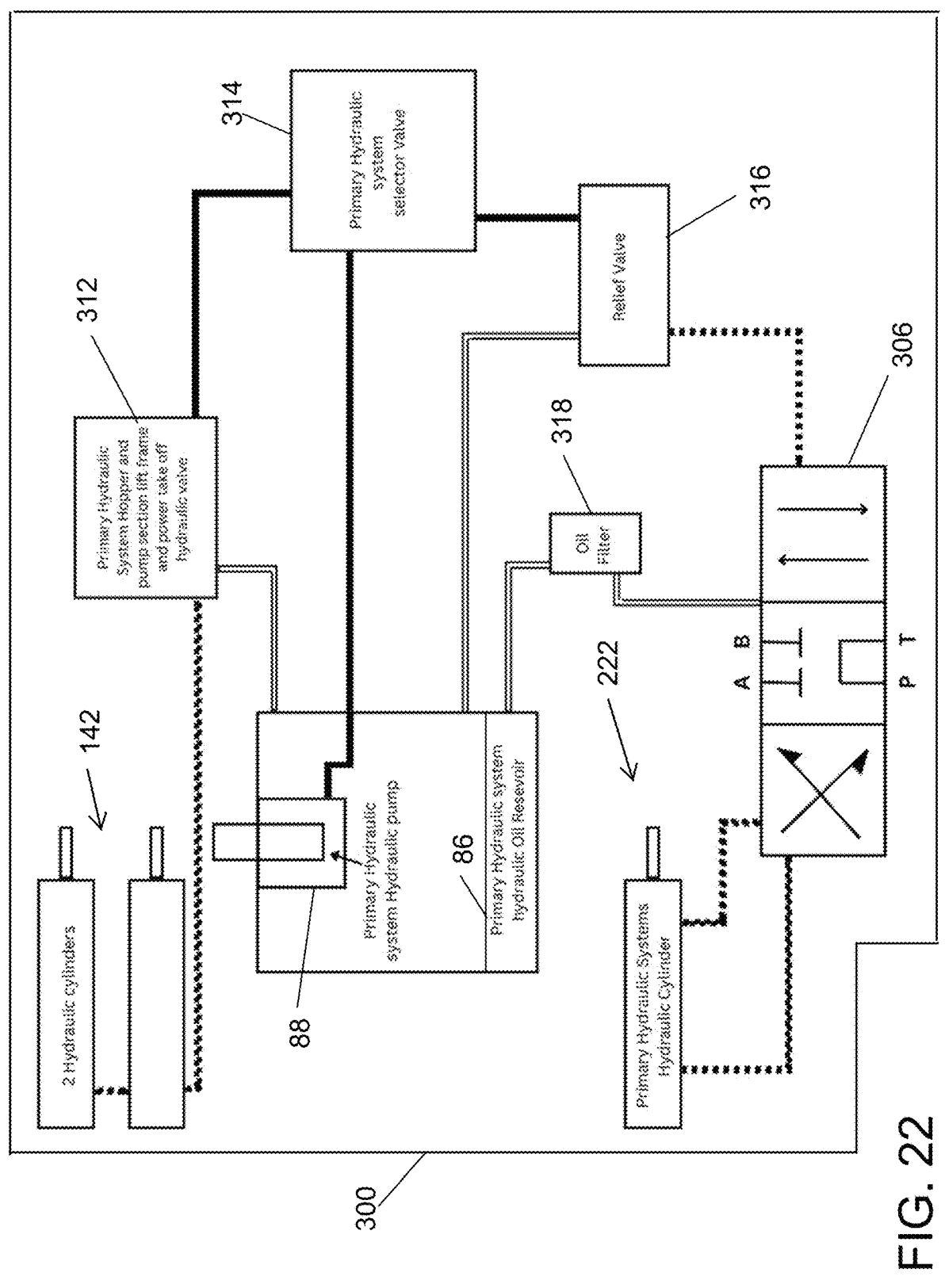
FIG. 22 is a schematic showing interconnection of hydraulic components of the abrasive slurry delivery apparatus of the present invention.

To better illustrate the various components of the mobile abrasive slurry delivery apparatus 10, FIGS. 1-11 do not show the hydraulic hoses extending between the lift cylinders 142, pump cylinder 222, hydraulic fluid pump 88 and hydraulic fluid reservoir 86. Further, these Figures do not show the electrical wiring interconnecting the various electrical components with the power supply. However, installation of these fluid lines and electrical conduits is well known to those skilled in the art. Referring next to FIG. 22 a schematic illustrates the interconnection of the various hydraulic components of the abrasive slurry delivery apparatus 10 of the present invention. The hydraulic system 300 of the mobile abrasive slurry delivery apparatus 10 includes hydraulic directional controls 306 coupled in line with the hydraulic fluid reservoir 86 and hydraulic fluid pump 88. Valves 312, 314, and 316 are used to control the flow of hydraulic fluid to the lift cylinders 142 and to the pump cylinder 222.

Figure 23:
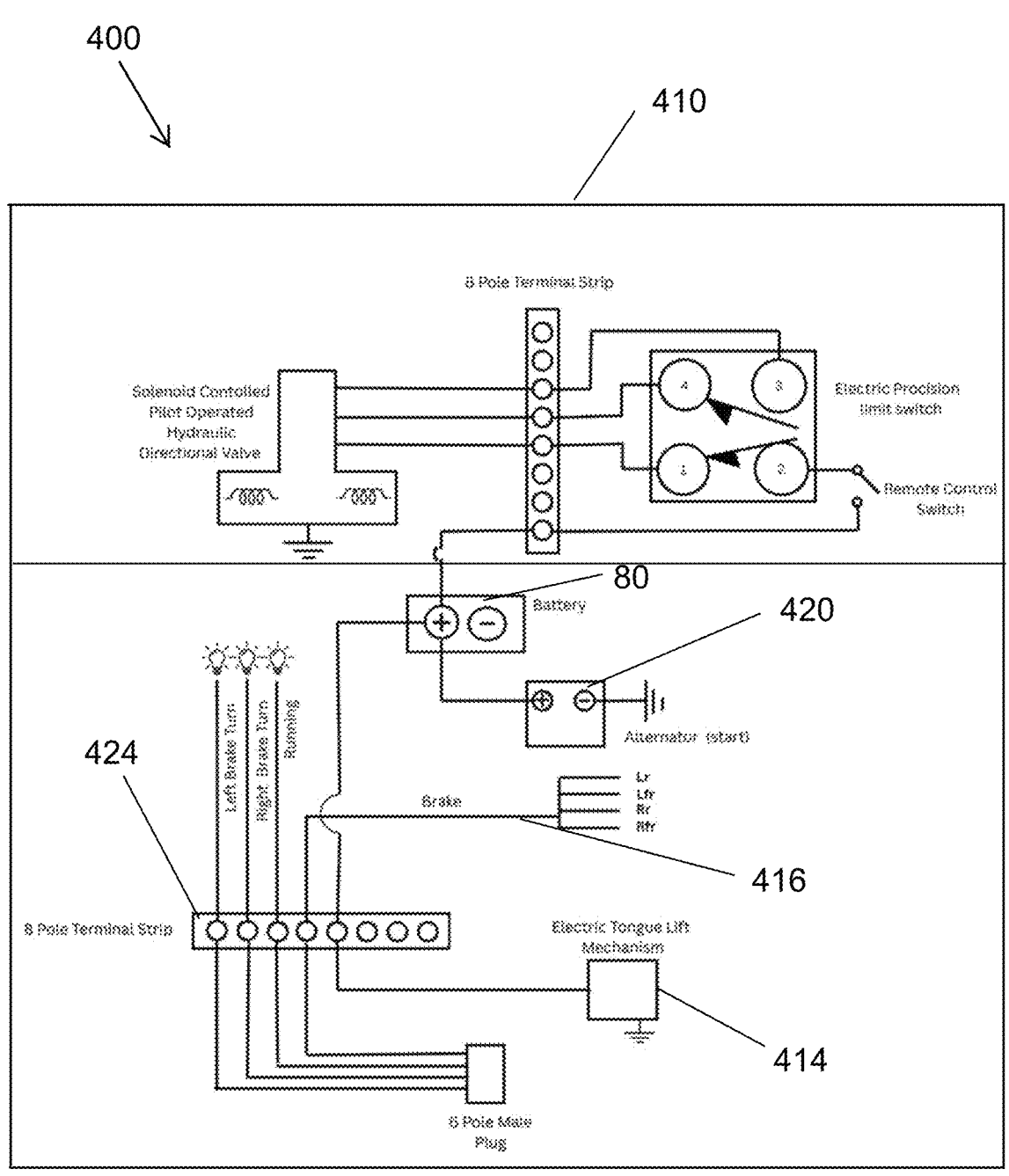
FIG. 23 is an electrical schematic showing electrical interconnection of electrical components of the abrasive slurry delivery apparatus of the present invention.

Referring to FIG. 23, an electrical schematic 400 illustrates the interconnection of the various electrical components with a power supply or battery 80. Current is supplied from battery 80 to a hydraulic directional control 410 which a terminal bar that interconnects an electric limit switch, a remote operated switch and a solenoid controlled pilot operated directional valve. The battery 80 is also electrically coupled to provide current to an electric tongue lift 414. The battery is further coupled to terminal strip 424 to provide current to a brake module 416, and brake lights switched from a vehicle control box 418. Further the battery may be electrically coupled to a terminal switch and outlet box 418 (not shown in the schematic). An alternator may be electrically coupled to the battery 80 to recharge the battery 80. A single user may use the power controls 418 and the hydraulic directional controls 306 at the front of the trailer or the sub controls 330 at the rear of the trailer to operate the hydraulic pump 200 and control the hydraulic lifting or tilting or dumping of the hopper 150.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open-ended sense in that elements in addition to those enumerated may also be present. Other examples will be apparent to those of skill in the art upon reviewing this document.

The following claims are incorporated into this description.

The invention claimed is:

1. A mobile abrasive slurry delivery apparatus, the apparatus comprising:
   a base frame;
   a hopper frame rotationally coupled to the base frame;
   a hopper having a bottom section, sidewalls, a front end wall and a rear end wall, wherein the sidewalls, the front end wall and the rear end wall extend upward from the bottom section, and wherein the bottom section includes a main segment and a secondary segment such that the secondary segment extends upward at an angle less than ninety degrees from a plane of the main segment, and further wherein the secondary segment has a slurry outlet opening formed in the secondary segment;
   a slurry tube coupled to the hopper in a sealing alignment with the slurry outlet opening of the secondary segment;
   an abrasive slurry pump mounted to the hopper and aligned with the slurry outlet opening of the secondary segment wherein a free end of the abrasive slurry pump extends into the slurry tube; and hydraulic lift cylinders, each hydraulic lift cylinder having a first end coupled to the base frame and a second end coupled to the hopper frame.

2. The mobile abrasive slurry delivery apparatus as recited in claim 1, wherein the abrasive slurry pump includes a hydraulic cylinder, a pump piston, and a plunger.

3. The mobile abrasive slurry delivery apparatus as recited in claim 2, wherein the plunger of the abrasive slurry pump is slidingly engaged to a pump piston rod of the pump piston.

4. The mobile abrasive slurry delivery apparatus as recited in claim 3, wherein the plunger of the abrasive slurry pump includes a base and pump piston rod guides.

5. The mobile abrasive slurry delivery apparatus as recited in claim 4, wherein the pump piston rod guides of the plunger slidingly engage with the pump piston rod of the pump piston.

6. The mobile abrasive slurry delivery apparatus as recited in claim 4, wherein the base of the plunger is cylindrical and the base includes a bore extending through the base along a longitudinal axis of the base.

7. The mobile abrasive slurry delivery apparatus as recited in claim 6, further including an edge of an end of the bore of the base aligned towards the pump piston rod and wherein the edge is chamfered.

8. The mobile abrasive slurry delivery apparatus as recited in claim 2, wherein the pump piston includes a rod coupling, a pump piston rod, and a lower piston.

9. The mobile abrasive slurry delivery apparatus as recited in claim 8, wherein the lower piston is positioned at a free end of the pump piston and the lower piston includes a chamfer on an outer end of the lower piston.

10. The mobile abrasive slurry delivery apparatus as recited in claim 1, further including a hydraulic reservoir and a hydraulic pump fluidly coupled to the hydraulic lift cylinders and the abrasive slurry pump.

11. The mobile abrasive slurry delivery apparatus as recited in claim 1, further including hydraulic directional controls fluidly coupled between the hydraulic pump and the hydraulic lift cylinders and the abrasive slurry pump to control flow of a hydraulic fluid between the hydraulic lift cylinders and the abrasive slurry pump.

12. A mobile abrasive slurry delivery apparatus, the apparatus comprising:
   a base frame;
   a hopper frame rotationally coupled to the base frame;
   a hopper having a bottom section, sidewalls, a front end wall and a rear end wall, wherein the sidewalls, the front end wall and the rear end wall extend upward from the bottom section, and wherein the bottom section includes a main segment and a secondary segment such that the secondary segment extends upward at an angle less than ninety degrees from a planar surface of the main segment, and further wherein the secondary segment has a slurry outlet opening formed in the secondary segment;

a slurry tube coupled to the hopper in a sealing alignment with the slurry outlet opening of the secondary segment;
   an abrasive slurry pump mounted to the hopper and aligned with the slurry outlet opening of the secondary segment, wherein a free end of the abrasive slurry pump extends into the slurry tube and further wherein the abrasive slurry pump includes a hydraulic cylinder, a pump piston, and a plunger, and also wherein the plunger of the abrasive slurry pump includes a base and pump piston rod guides;
   hydraulic lift cylinders, each hydraulic lift cylinder having a first end coupled to the base frame and a second end coupled to the hopper frame;
   a hydraulic fluid reservoir; and
   a hydraulic pump fluidly coupled between the hydraulic fluid reservoir and the hydraulic lift cylinders and the abrasive slurry pump.

13. The mobile abrasive slurry delivery apparatus as recited in claim 12, wherein the pump piston includes a pump piston rod, and the plunger of the abrasive slurry pump is slidingly engaged to the pump piston rod of the pump piston.

14. The mobile abrasive slurry delivery apparatus as recited in claim 13, wherein the piston rod guides of the plunger slidingly engage with the pump piston rod of the pump piston.

15. The mobile abrasive slurry delivery apparatus as recited in claim 12, wherein the base of the plunger is cylindrical and the base includes a bore extending through the base along a longitudinal axis of the base.

16. The mobile abrasive slurry delivery apparatus as recited in claim 15, further including an edge of an end of the bore aligned towards the pump piston rod and wherein the edge is chamfered.

17. The mobile abrasive slurry delivery apparatus as recited in claim 12, wherein the pump piston includes a rod coupling, a pump piston rod, and a lower piston.

18. The mobile abrasive slurry delivery apparatus as recited in claim 17, wherein the lower piston is positioned at a free end of the pump piston and the lower piston includes a chamfer on an outer end of the lower piston.

19. The mobile abrasive slurry delivery apparatus as recited in claim 12, further including hydraulic directional controls fluidly coupled between the hydraulic pump and the hydraulic lift cylinders and the abrasive slurry pump to control flow of a hydraulic fluid between the hydraulic lift cylinders and the abrasive slurry pump.

20. The mobile abrasive slurry delivery apparatus as recited in claim 12, wherein the lower piston of the pump piston and the base of the plunger are made of carbon steel.

* * * * *